US011994121B1

(12) United States Patent
Cannata

(10) Patent No.: US 11,994,121 B1
(45) Date of Patent: May 28, 2024

(54) PISTON IN PISTON VARIABLE DISPLACEMENT HYDRAULIC DEVICE

(71) Applicant: TONAND INC., London (CA)

(72) Inventor: Antonio Cannata, London (CA)

(73) Assignee: TONAND INC., London (CA)

( * ) Notice: Subject to any disclaimer, the term of this patent is extended or adjusted under 35 U.S.C. 154(b) by 0 days.

(21) Appl. No.: 18/536,668

(22) Filed: Dec. 12, 2023

Related U.S. Application Data

(60) Provisional application No. 63/547,482, filed on Nov. 6, 2023, provisional application No. 63/472,197, filed on Jun. 9, 2023.

(51) Int. Cl.
*F04B 3/00* (2006.01)
*F01B 7/18* (2006.01)
(Continued)

(52) U.S. Cl.
CPC ................ *F04B 3/003* (2013.01); *F01B 7/18* (2013.01); *F01B 7/20* (2013.01); *F04B 1/0435* (2013.01);
(Continued)

(58) Field of Classification Search
CPC ...... F15B 15/1409; F04B 3/003; F04B 25/02; F04B 1/0435; F04B 9/025; F01B 7/18; F01B 7/20
(Continued)

(56) References Cited

U.S. PATENT DOCUMENTS 1,263,401 A * 4/1918 Fraser ........................ F04B 5/02
92/6 R
4,386,889 A * 6/1983 Tichy .................... F04B 19/022
417/487
(Continued)

*Primary Examiner* — Dustin T Nguyen

(57) ABSTRACT

A variable displacement hydraulic device comprising: a housing having an inlet for receiving hydraulic fluid and an outlet for outputting the hydraulic fluid, the housing having a reciprocation axis; a first cylinder positioned in the housing along the reciprocation axis, the first cylinder having a first input for receiving the hydraulic fluid on a first intake stroke and a first output for ejecting the hydraulic fluid on a first exhaust stroke; a first piston positioned for a first reciprocal motion within the first cylinder, the first piston having a first main end exposed to the hydraulic fluid and a second main end coupled to an actuator, the actuator for driving the second main end when coupled to the actuator for causing the first reciprocal motion to induce a first portion of said outputting of the hydraulic fluid; a second cylinder positioned in the first piston along the reciprocation axis, the second cylinder having a second input for receiving the hydraulic fluid on a second intake stroke and a second output for ejecting the hydraulic fluid on a second exhaust stroke; a second piston positioned for a second reciprocal motion within the second cylinder, the second piston having a first secondary end exposed to the hydraulic fluid and a second secondary end coupled to the actuator, the actuator for driving the second secondary end when coupled to the actuator for causing the second reciprocal motion to induce a second portion of said outputting of the hydraulic fluid; and a locking mechanism for inhibiting the first reciprocal motion of the first piston; wherein when engaged the locking mechanism inhibits the first portion of said outputting of the hydraulic fluid by decoupling the first piston from the actuator while continued operation of the actuator provides the second portion of said outputting of the hydraulic fluid by the second piston.

29 Claims, 27 Drawing Sheets

(51) Int. Cl.

| | |
|---|---|
| ***F01B 7/20*** | (2006.01) |
| ***F04B 1/0435*** | (2020.01) |
| *F04B 25/02* | (2006.01) |
| *F15B 11/16* | (2006.01) |
| *F15B 15/14* | (2006.01) |
| *F15B 15/16* | (2006.01) |
| *F15B 15/26* | (2006.01) |

(52) U.S. Cl.
CPC ............... *F04B 25/02* (2013.01); *F15B 11/16* (2013.01); *F15B 15/1409* (2013.01); *F15B 15/16* (2013.01); *F15B 15/261* (2013.01)

(58) Field of Classification Search
USPC .............................................................. 92/107
See application file for complete search history.

(56) References Cited

U.S. PATENT DOCUMENTS

| | | | | |
|---|---|---|---|---|
| 8,746,128 | B2 * | 6/2014 | Cannata | F15B 1/24<br>92/81 |
| 9,175,676 | B2 * | 11/2015 | Fortin | F04B 9/14 |
| 9,784,253 | B2 * | 10/2017 | Cannata | F04B 3/003 |
| 2007/0116588 | A1 * | 5/2007 | Frefel | F04B 5/02<br>417/521 |

* cited by examiner 8A
8B
8C
8D
105
115
120
125
140
13
12
112
110
20
25
90
95
85
100

PISTON IN PISTON VARIABLE DISPLACEMENT HYDRAULIC DEVICE

CROSS-REFERENCE TO RELATED APPLICATIONS

The present application claims priority from U.S. provisional patent application No. 63/547,482 filed on Nov. 6, 2023, entitled "PISTON IN PISTON VARIABLE DISPLACEMENT HYDRAULIC DEVICE", the entire contents of which are hereby incorporated by reference herein, and also claims priority from U.S. provisional patent application No. 63/472,197 filed on Jun. 9, 2023; entitled "PISTON IN PISTON VARIABLE DISPLACEMENT HYDRAULIC DEVICE"; the entire contents of which are hereby incorporated by reference herein.

FIELD

The present disclosure relates to hydraulic devices.

BACKGROUND

Hydraulic pumps and motors are used predominantly in industry when mechanical actuation is desired to convert hydraulic pressure and flow into torque and angular (rotation). Examples of hydraulic application can be in braking systems, propulsion systems (e.g. automotive, drilling) as well as in electrical energy generation systems (e.g. windmills). Other common uses of hydraulic devices as a direct drive system can be in drilling rigs, winches and crane drives, wheel motors for vehicles, cranes, and excavators, conveyor and feeder drives, mixer and agitator drives, roll mills, drum drives for digesters, kilns, trench cutters, high-powered lawn trimmers, and plastic injection machines. Further, hydraulic pumps, motors, can be combined into hydraulic drive systems, for example one or more hydraulic pumps coupled to one or more hydraulic motors constituting a hydraulic transmission.

Due to currently available configurations, there exists disadvantages with hydraulic devices when operated in systems exhibiting dynamic variation fluid flow requirements. For example, the torque requirements of a load in a hydraulic system can dynamically change, such that the hydraulic device must instantaneously react to the changing flow conditions dictated by the dynamic change in the torque.

In terms of current axial piston pump configurations, there exists mechanical complications in the design and use of variable angle rotating drive plates (i.e. wobble plate), in order to dynamically change the fluid flow in response to the changing torque conditions. As such, current axial piston pump designs tend to have higher than desired maintenance costs and issues, are considered operationally inefficient as compared to other reciprocating piston pump designs, and more importantly, current axial piston pumps and motors produce vibration/noise (e.g. Fluidborne noise and Structuralborne Noise). These disadvantages with current axial piston pump design are considered by the industry as the two primary, potentially unsolvable and unwanted problems.

SUMMARY

It is an object of the present invention to provide a hydraulic device to obviate or mitigate at least some of the above presented disadvantages.

A first aspect provided is a variable displacement hydraulic device comprising: a housing having an inlet for receiving hydraulic fluid and an outlet for outputting the hydraulic fluid, the housing having a reciprocation axis; a first cylinder positioned in the housing along the reciprocation axis, the first cylinder having a first input for receiving the hydraulic fluid on a first intake stroke and a first output for ejecting the hydraulic fluid on a first exhaust stroke; a first piston positioned for a first reciprocal motion within the first cylinder, the first piston having a first main end exposed to the hydraulic fluid and a second main end coupled to an actuator, the actuator for driving the second main end when coupled to the actuator for causing the first reciprocal motion to induce a first portion of said outputting of the hydraulic fluid; a second cylinder positioned in the first piston along the reciprocation axis, the second cylinder having a second input for receiving the hydraulic fluid on a second intake stroke and a second output for ejecting the hydraulic fluid on a second exhaust stroke; a second piston positioned for a second reciprocal motion within the second cylinder, the second piston having a first secondary end exposed to the hydraulic fluid and a second secondary end coupled to the actuator, the actuator for driving the second secondary end when coupled to the actuator for causing the second reciprocal motion to induce a second portion of said outputting of the hydraulic fluid; and a locking mechanism for inhibiting the first reciprocal motion of the first piston; wherein when engaged the locking mechanism inhibits the first portion of said outputting of the hydraulic fluid by decoupling the first piston from the actuator while continued operation of the actuator provides the second portion of said outputting of the hydraulic fluid by the second piston.

A further aspect is a variable displacement hydraulic device comprising: a housing having an inlet for receiving hydraulic fluid and an outlet for outputting the hydraulic fluid, the housing having a reciprocation axis; a plurality of piston groups in the housing, such that each of the piston groups has a plurality of pistons positioned adjacent to one another; each of the piston groups of the plurality of piston groups is coupled to a respective inlet gallery, such that the plurality of pistons of a respective piston group are fed hydraulic fluid from the same respective inlet gallery; a locking mechanism for inhibiting reciprocal motions of the plurality of pistons of a respective piston group by restricting hydraulic fluid from said same respective inlet gallery; wherein when engaged the locking mechanism inhibits the reciprocal motions and thus outputting of a portion of the hydraulic fluid by decoupling the plurality of pistons from their actuators while when disengaged the locking mechanism facilitates the reciprocal motions and thus outputting of the portion of the hydraulic fluid by encouraging coupling of the plurality of pistons to their actuators.

BRIEF DESCRIPTION OF THE DRAWINGS

The foregoing and other aspects will now be described by way of example only with reference to the attached drawings, in which.

DETAILED DESCRIPTION

Figure 1:
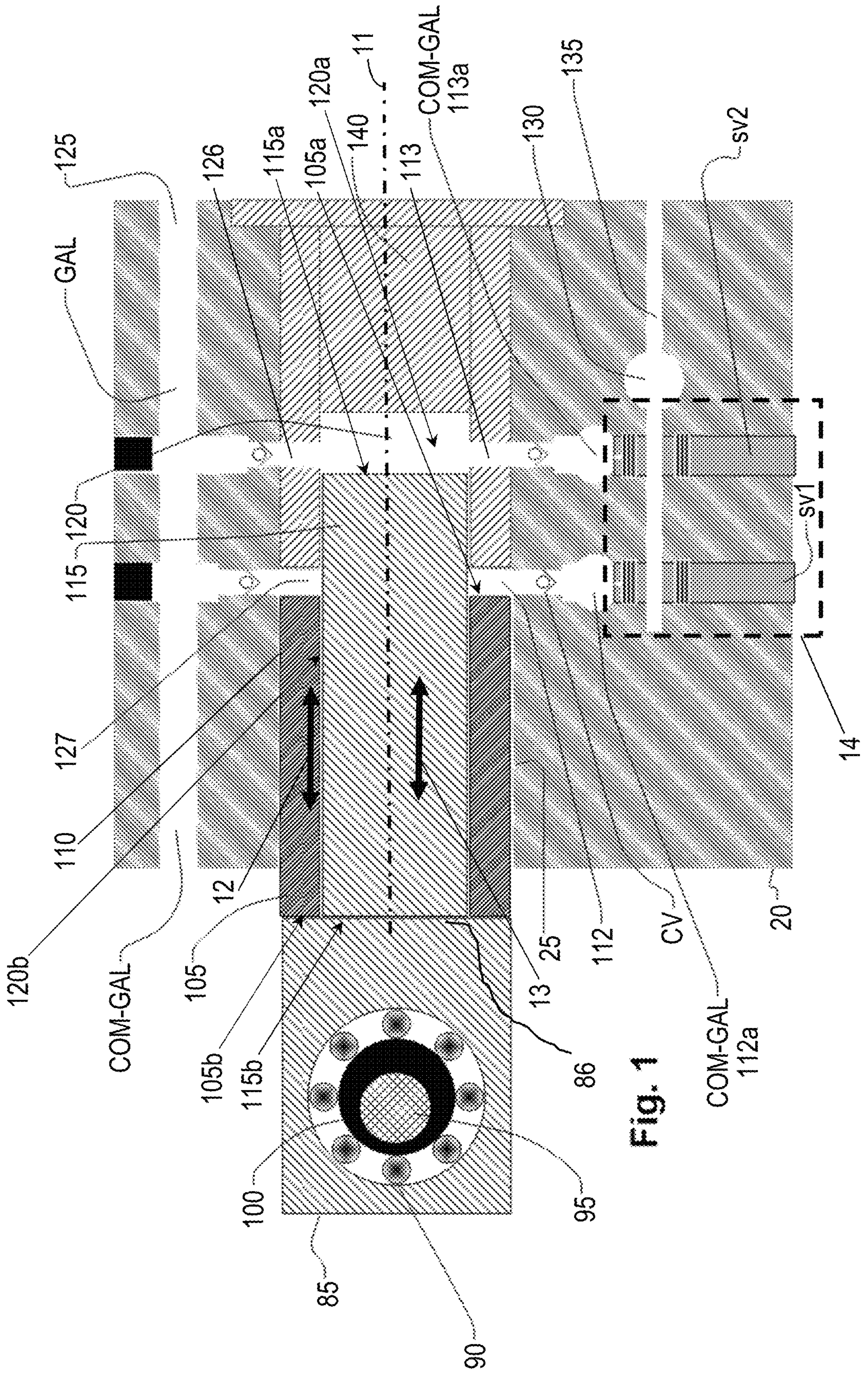
FIG. 1 refers to a first embodiment of a hydraulic device.
Figure 10:
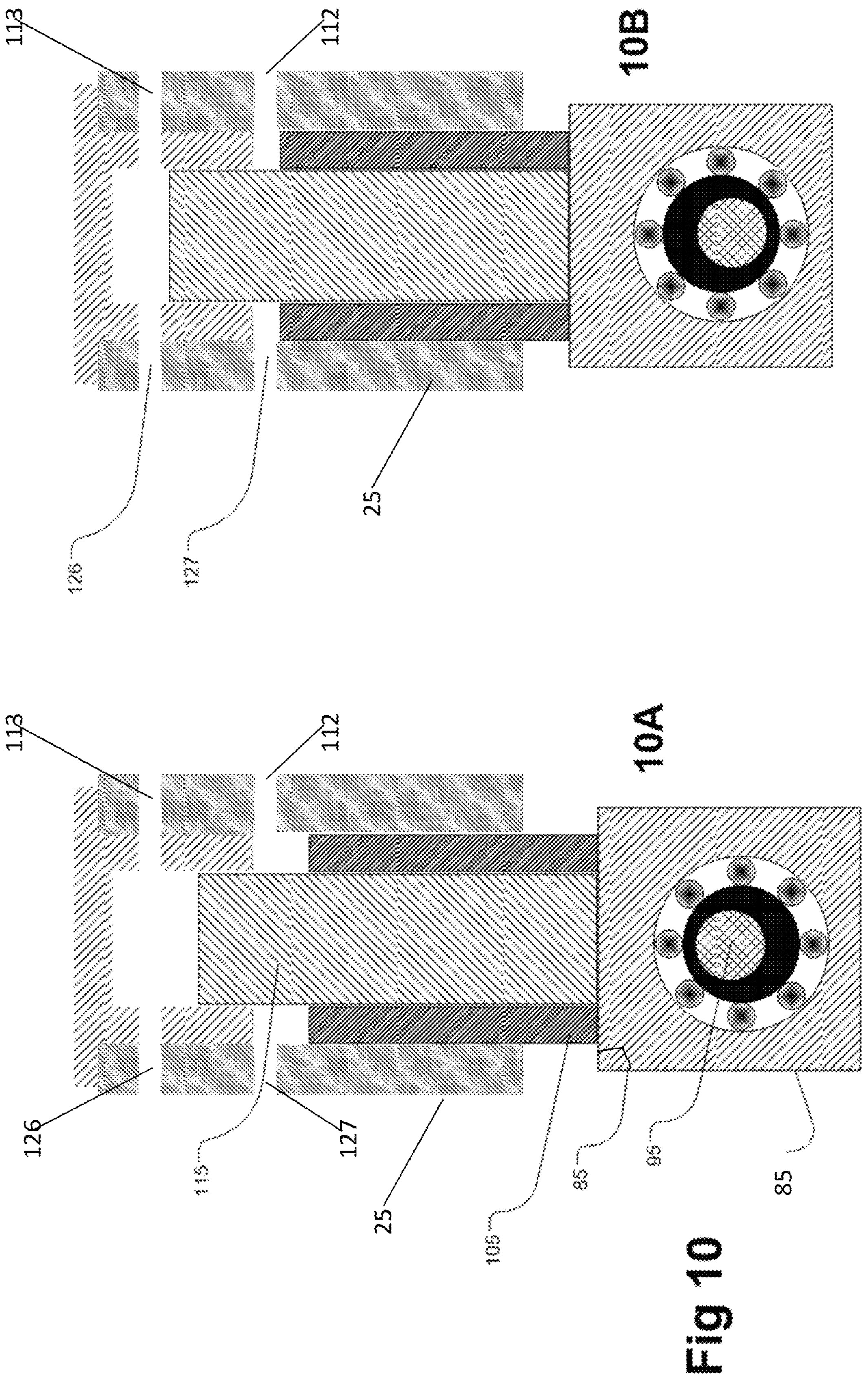
FIG. 10A,B are a side view of a further embodiment of the hydraulic device of FIG. 1.

Referring to FIG. 1, shown is a cutaway side view of a variable displacement hydraulic device 20 (e.g. a pump or a motor) having a primary piston 105 and a secondary piston 115. The device 20 has a housing 25 having a common inlet 135 for receiving hydraulic fluid and a common outlet 125 for outputting the hydraulic fluid, the housing 25 having a reciprocation axis 11 for axial reciprocation 12, 13 of the primary piston 105 and/or the secondary piston 115 respectively. The housing has a main cylinder bore 110 positioned in the housing 25 along the reciprocation axis 11, the main cylinder bore 110 having a first input 112 (e.g. bore, passage, etc.) for receiving the hydraulic fluid on a first intake stroke of the primary piston 105 and a first output 127 for ejecting the hydraulic fluid on a first exhaust stroke of the primary piston 105. It is recognized that the main/primary piston 105 is positioned for a first reciprocal motion 12 within the main cylinder bore 110, the main piston 105 having a first main end 105*a* exposed to the hydraulic fluid and a second main end 105*b* coupled to an actuator 85, the actuator 85 for driving the second main end 105*b* when coupled to the actuator 85 for causing the first reciprocal motion 12 to induce a first portion of the outputting of the hydraulic fluid via the output 127, which can provide for a shared input and/or output configuration, or a split flow configuration (see FIG. 10). It is recognized that coupling with the actuator 85 can be defined as when a surface 86 is adjacent and in contact with the end(s) 105*b*, 115*b*. Alternatively, decoupled can be defined as when the surface 86 is spaced apart from and thus out of contact with the end(s) 105*b*, 115*b*.

It is recognized that each of the pistons 105,115 operate on a fixed stroke length when coupled to the actuator 85 (e.g. reciprocating between TDC and BDC). In view of the fixed stroke length during operation of the hydraulic device 20 (for those pistons 105,115 in an unlocked state—further described below), variability of hydraulic device 20 throughput of hydraulic fluid (e.g. in pump mode or in motor mode) is done by locking selected pistons 105, 115 rather than varying the length of the stroke of piston(s) as is done in prior art pumps.

Referring again to FIG. 1, the hydraulic device 20 has a second cylinder bore 120 positioned in the main piston 105 and in the housing 25 along the reciprocation axis 11 (e.g. concentric with the reciprocation axis 11 or non-concentric with the reciprocation axis 11, as desired), the second cylinder bore 120 having a second input 113 for receiving the hydraulic fluid on a second intake stroke and a second output 126 for ejecting the hydraulic fluid on a second exhaust stroke. It is recognized that the second cylinder bore 120 is comprised of two portions, a first portion 120*a* positioned in the housing 25 and a second portion 120*b* positioned in the min piston 105. In this manner, the second cylinder bore 120 is made of two parts, namely 120*a*, 120*b*, which are aligned to facilitate the second reciprocal motion 13 (e.g. axial) of the second piston 115. Accordingly, the secondary piston 115 is positioned for the second reciprocal motion 13 within the second cylinder 120, the secondary piston 115 having a first secondary end 115*a* exposed to the hydraulic fluid (located in the first portion 120*a*) and a second secondary end 115*b* coupled to the actuator 85 (e.g. the same actuator 85 for both the primary piston 105 and the secondary piston 115), the actuator 85 for driving the second secondary end 115*b* when coupled to the actuator 85 for causing the second reciprocal motion 13 in order to induce a second portion of the outputting of the hydraulic fluid from the hydraulic device 20. Both the pistons 105, 115 are shown in FIG. 1 in a Top Dead Center (TDC) position in their respective bores 110, 120. It is recognized that the main piston 105 can also be referred to as a secondary piston 105 and the second piston 115 can also be referred to as a secondary piston 115. Further, the main piston 105 can be referred to as a first piston 105 and the secondary piston 115 can be referred to as a second piston 115. It is recognized that housing 25 can contain multiple sets the first piston 105 and the second piston 115 as multiple sets of pistons 105,115 (e.g. the housing 25 can contain two or more sets of pistons 105,115—see FIGS. 16, 17, 18 as examples of multiple sets of pistons 105,115 for the hydraulic device 20).

As shown in FIG. 1 by example, the secondary piston 115 can be concentrically positioned within the main piston 105 on the reciprocation axis 11, however other non-concentric configurations can be provided, as desired. Further, by example, the first output portion and the second output portion are fluidly coupled at the common outlet 125. Further, by example, the first input portion and the second input portion are fluidly coupled at the common inlet 135 (e.g. when the reciprocation 12 is occurring the hydraulic fluid is drawn through the input 112 and when the reciprocation 13 is occurring the hydraulic fluid is drawn through the input 113). It is recognized that the single port inlet 135 (e.g. a single port fitting for the housing 25) can be coupled to a common gallery 130, such that multiple sets of the pistons 105, 115 (of a multi piston pair hydraulic device 20—see FIG. 16) can be provided hydraulic fluid at the same time. It is also recognized that each set of pistons 105, 115 (e.g. a piston pair) would have their own flow control valves SV1, SV2, such that variable displacement mode vs full displacement mode can be controlled via each respective set of control valves SV1, SV2, or another version of the locking mechanism 14, as desired. Further, in the case of the hydraulic device 25 being a motor, inputs 112*a*, 113*a* adjacent to the flow control valves SV!, SV2 can be utilized as common galleries.

A variable displacement mode for a piston pair 105, 115 can be when one or both of the flow control valves SV1, SV2 is/are closed, e.g. the locking mechanism 14 is employed, thus resulting in one or both of the pistons 105, 115 ceasing their reciprocal motion 12, 13 and thus becoming held at their respective TDC (i.e. decoupled from the actuator 85) as further described below.

Figure 2:
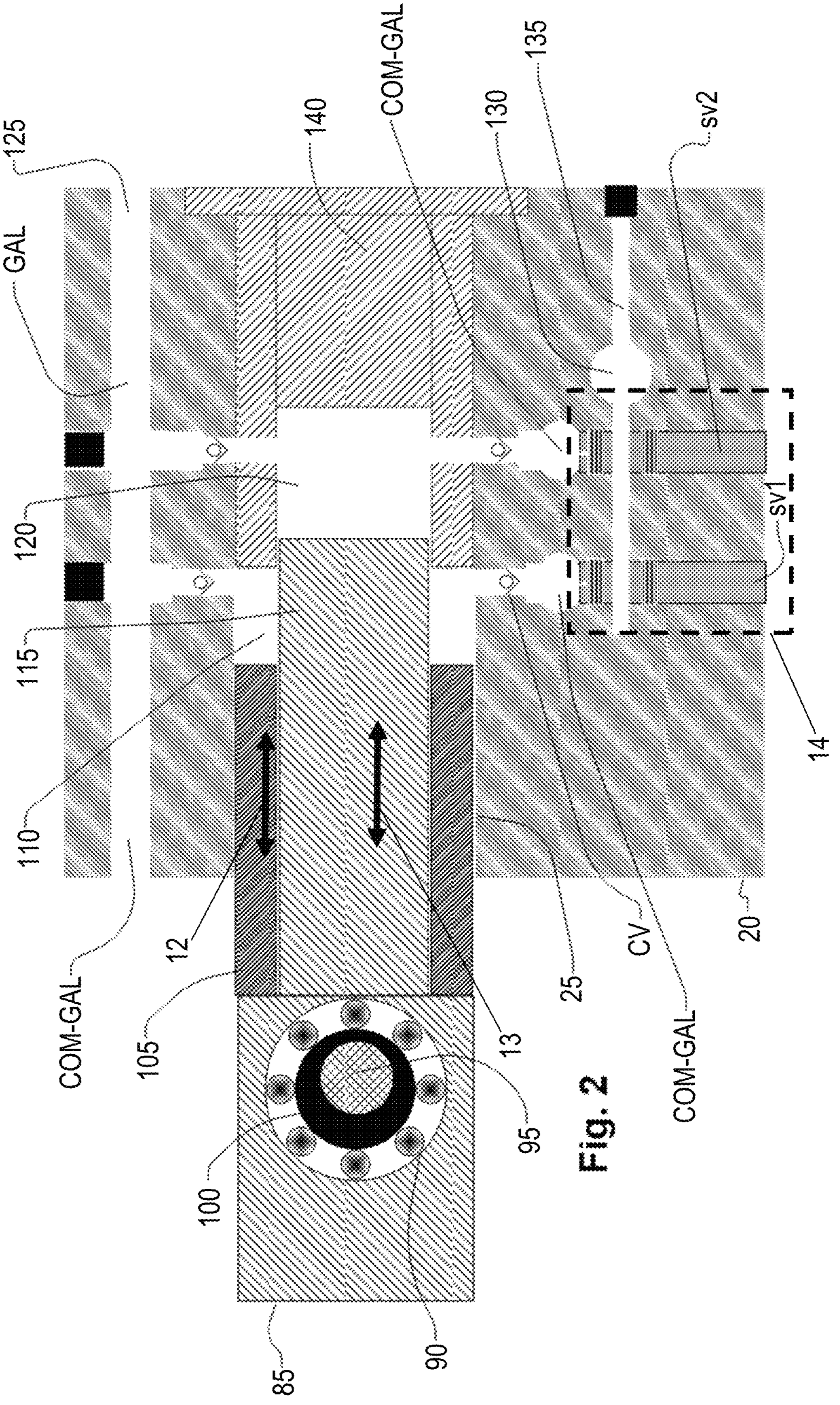
FIG. 2 is an view of the hydraulic device of FIG. 1 in the full or maximum displacement state.

Referring to FIG. 2, shown is one embodiment of a locking mechanism 14 for inhibiting the first reciprocal motion 12 of the main piston 105 and/or the second reciprocal motion 13 of the secondary piston 115. In the present example, the locking mechanism 14 is the pair of flow valves (SV1, SV2, e.g. solenoid) for blocking the inflow of hydraulic fluid to either or both of the first input 112 and the second input 113, however in FIG. 2 the locking mechanism 14 is unactivated. Both the pistons 105, 115 are shown in FIG. 2 in a Bottom Dead Center (BDC) position in their respective bores 110, 120, as the actuator 85 continues to provide for both reciprocations 12, 13 together/at the same time. In this manner, operation of the hydraulic device 20 between the TDC and BDC positions of FIGS. 1 and 2 provide for a full/constant displacement of the hydraulic device 20 (i.e. the first and second output portions of the hydraulic fluid are both ejected from the common output 135 of the respective piston 105, 115 pair). It is recognized that each piston pair 105, 115 can be controlled (for example on demand, by the operator, etc.) to switch between variable displacement mode and full displacement mode using their respective flow control valve(s) SV1, SV2 (e.g. an example locking mechanism 14) during operation of the hydraulic device 20.

In view of the above, one embodiment of the locking mechanism 14 is a hydraulic locking mechanism, such that the hydraulic locking mechanism inhibits at least one of: the first input 112 from receiving the hydraulic fluid on the first intake stroke; and the first output 127 from ejecting (not shown) the hydraulic fluid on the first exhaust stroke; and/or the second input 113 from receiving the hydraulic fluid on the second intake stroke; and the second output 126 from ejecting (not shown) the hydraulic fluid on the second exhaust stroke. For example, the hydraulic locking mechanism 14 includes at least one of: a first flow valve SV1, SV2 positioned as shown by example on the input(s)112, 113 for inhibiting receipt of the hydraulic fluid on the first/second intake stroke; a second valve (not shown) positioned on the output(s)126, 127 (not shown) for inhibiting ejection of the hydraulic fluid on the first/second exhaust stroke.

Figure 9A:
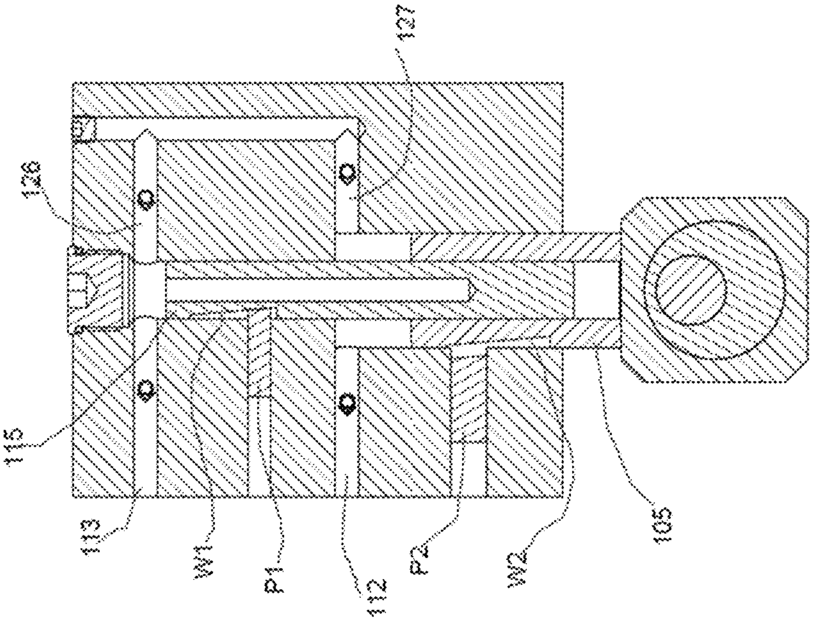
FIG. 9A,B,C,D,E,F provide further embodiments of the locking mechanism FIG. 1.

Referring to FIG. 9A,B,C,D,E,F, shown are alternative examples of the locking, mechanism 14. For example, the locking mechanism 14 is a mechanical locking mechanism, such that the mechanical locking mechanism 14 inhibits the first reciprocal motion 12. The mechanical locking mechanism 14 includes a mechanical element positioned adjacent to a sidewall of the main piston 105, such that contact of the mechanical element with the sidewall is used to inhibit the first reciprocal motion 12.

Figure 9B:
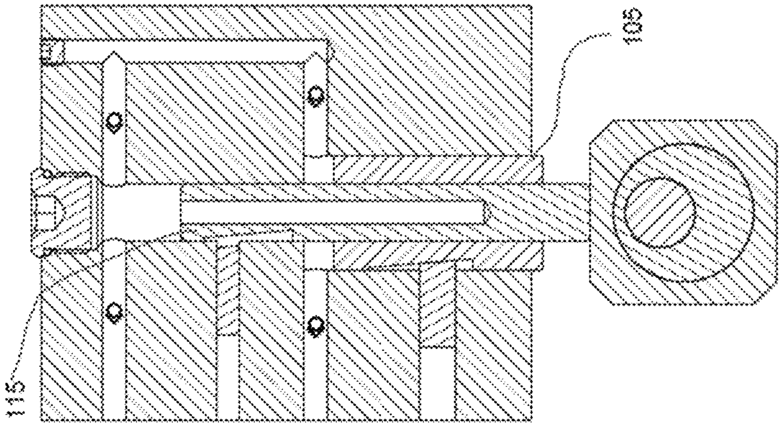
Figure 9D:
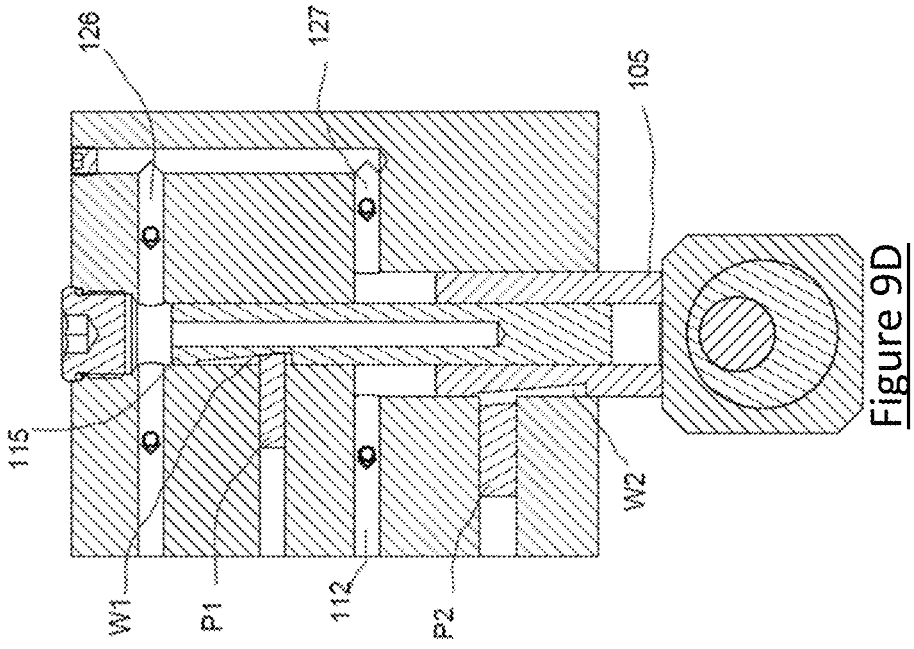
Figure 9C:
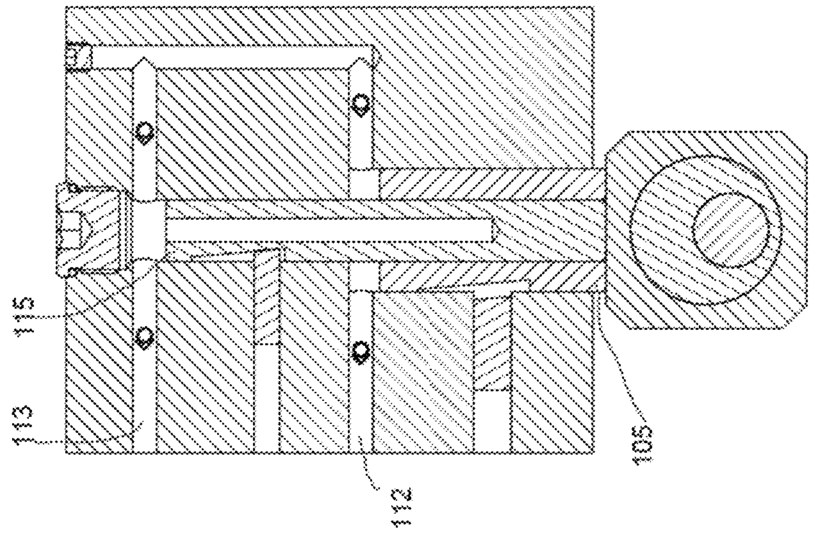
Figure 9F:
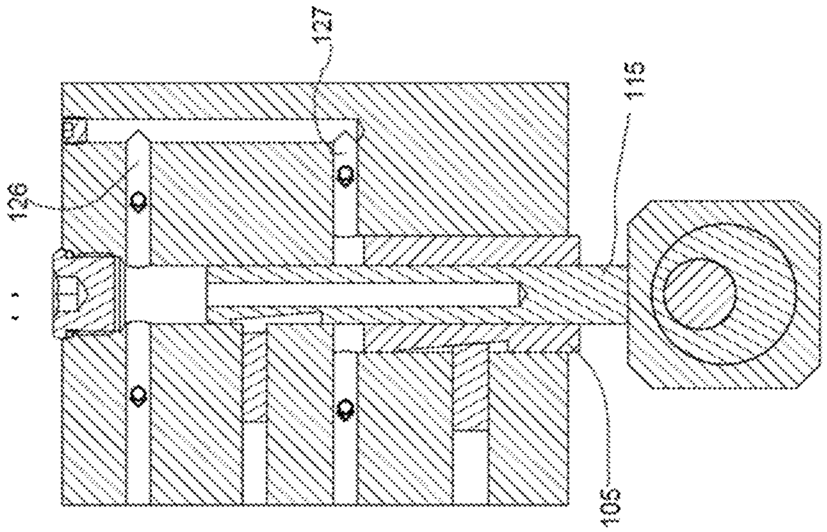
Figure 9E:
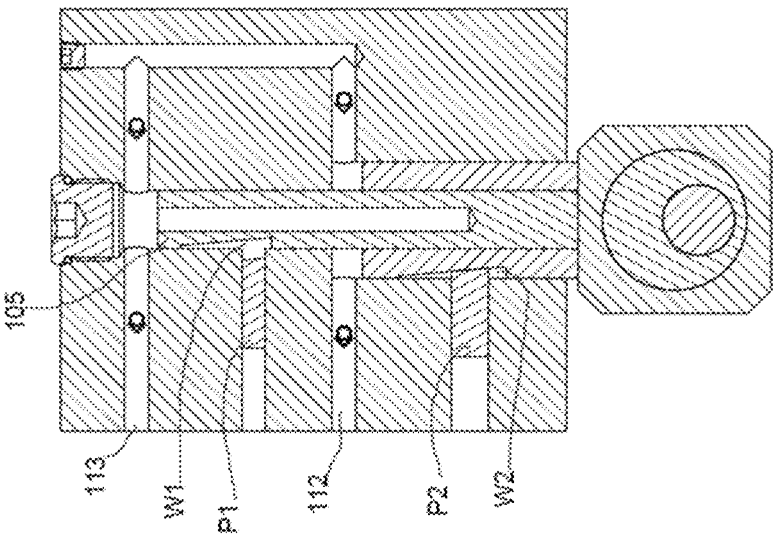

For example, FIGS. 9A, B,C,D,E,F show a mechanical lock 14 consisting of a pin P2 positioned adjacent to a ramp W2 located in a sidewall of the piston 105, as well as a pin P1 positioned adjacent to a ramp W1 located in a sidewall of the piston 115, in various operational modes. In the case of a piston 105, 115 which can turn in the bore 110 during the reciprocation 12, the ramp W1, W2 can be formed about the periphery of the sidewall of the piston 105,115. In FIG. 9A, the piston 115 is locked (pin P1 is engaged with ramp W1) at TDC while piston 105 is starting the exhaust stroke. In FIG. 9B, the mechanical lock 14 of pin P2 engages ramp W2 and piston 105 is locked at TDC while piston 115 is unlocked (pin P1 is disengaged with ramp W1) and thus starting the exhaust stroke. In FIG. 9C, the piston 105 is locked at TDC and the piston 115 is starting the intake stroke. In FIG. 9D, the piston 105 is locked at TDC and the piston 115 is starting the exhaust stroke. In FIG. 9E, the piston 115 is locked at TDC and the piston 105 is starting the intake stroke. In FIG. 9F, the piston 115 is locked at TDC and the piston 105 is starting the exhaust stroke.

In a further embodiment of the locking mechanism 14, the locking mechanism 14 can be a magnetic locking mechanism 14, such that the magnetic locking mechanism 14 inhibits the first reciprocal motion 12 and/or the second reciprocal motion 13. For example, the magnetic locking mechanism 14 can include a solenoid element positioned adjacent to a sidewall of the main piston 105 and/or the secondary piston 115, such that operation of the solenoid element(s) is used to inhibit the first reciprocal motion 12 and/or the second reciprocal motion 13.

It is also recognized that the locking mechanism 14 can be a combination of the hydraulic locking mechanism 14 (e.g. flow control valves SV1, SV2) and the mechanical locking mechanism 14 (e.g. mechanical elements or solenoid elements). It is recognized that when using the hydraulic locking mechanism 14, the locking operation can be provided by hydraulic vacuum which is systematically created when injection into and/or ejection from a selected cylinder-piston is truncated.

In view of the above, the locking mechanism 14 for each of the piston 105, 115 pairs can be used to provide a variable displacement of the hydraulic device, such that one or both of the pistons 105,115 is disconnected from the actuator 85 for one or more selected pairs of the multi pair hydraulic device 20. As discussed above, to disconnect a piston 105, 115, we can activate the respective locking mechanism 14 (e.g. using hydraulic lock we truncate the injection flow into the related bore 110, 120 by simply closing off the related solenoid flow control valve SV1, SV2). During the locking operation and thus the resulting decoupling of the locked piston 105, 115 from the actuator 85, the actuator 85 drives all pistons 105, 115 to TDC at which point, the piston without a new injection (e.g. locked) will be held at TDC. Once disconnected from the actuator 85, the piston(s) 105, 115 can be held at TDC by way of mechanical and/or vacuum lock (depending upon the desired locking mechanism(s) 14 employed by the hydraulic device 20). Any piston 105, 115 held at TDC will no longer contribute to the outlet flow volume for the outlet 125.

Figure 4:
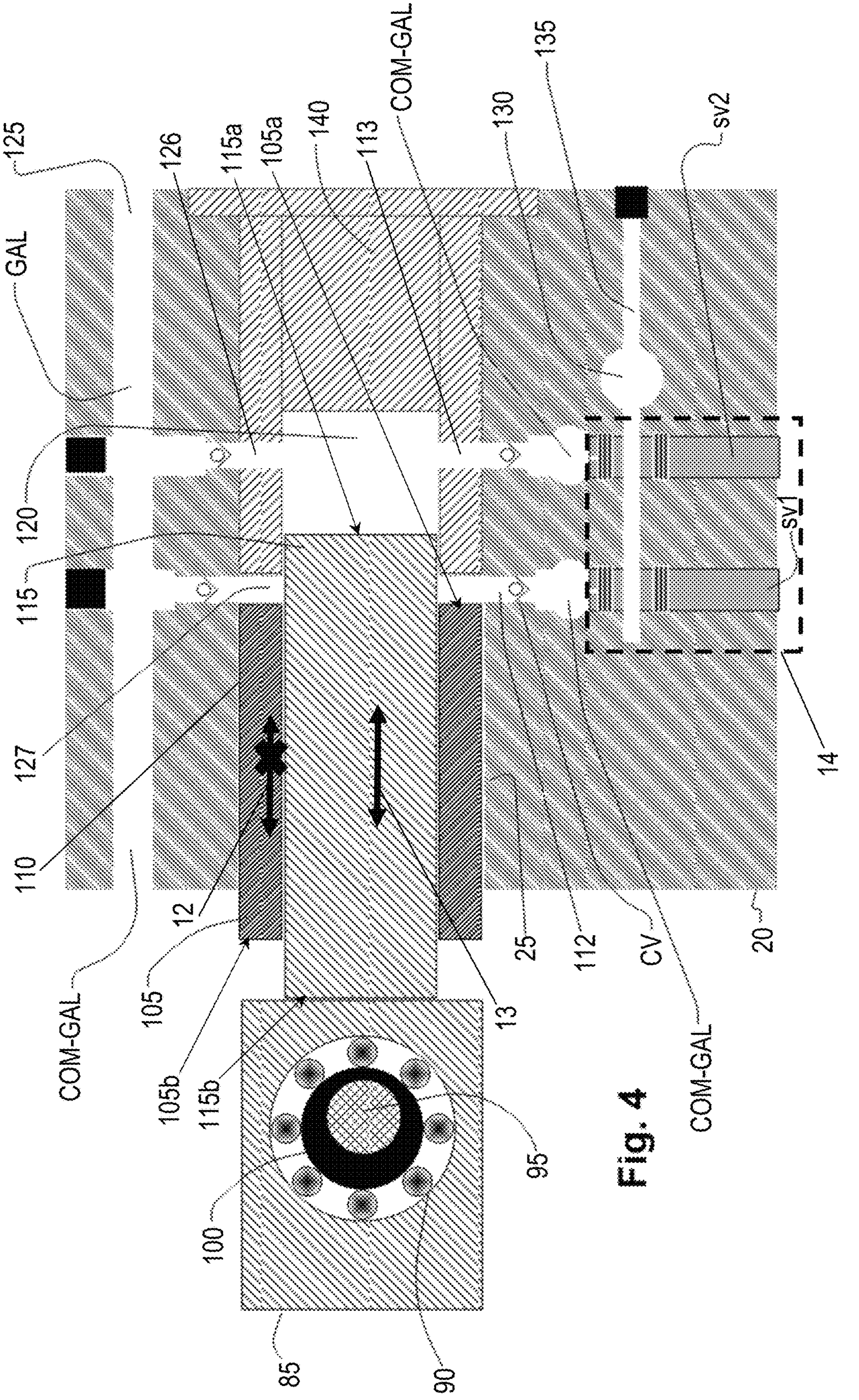
FIG. 4 is a view of the hydraulic device of FIG. 1 in a second locked state for variable displacement operation.
Figure 5:
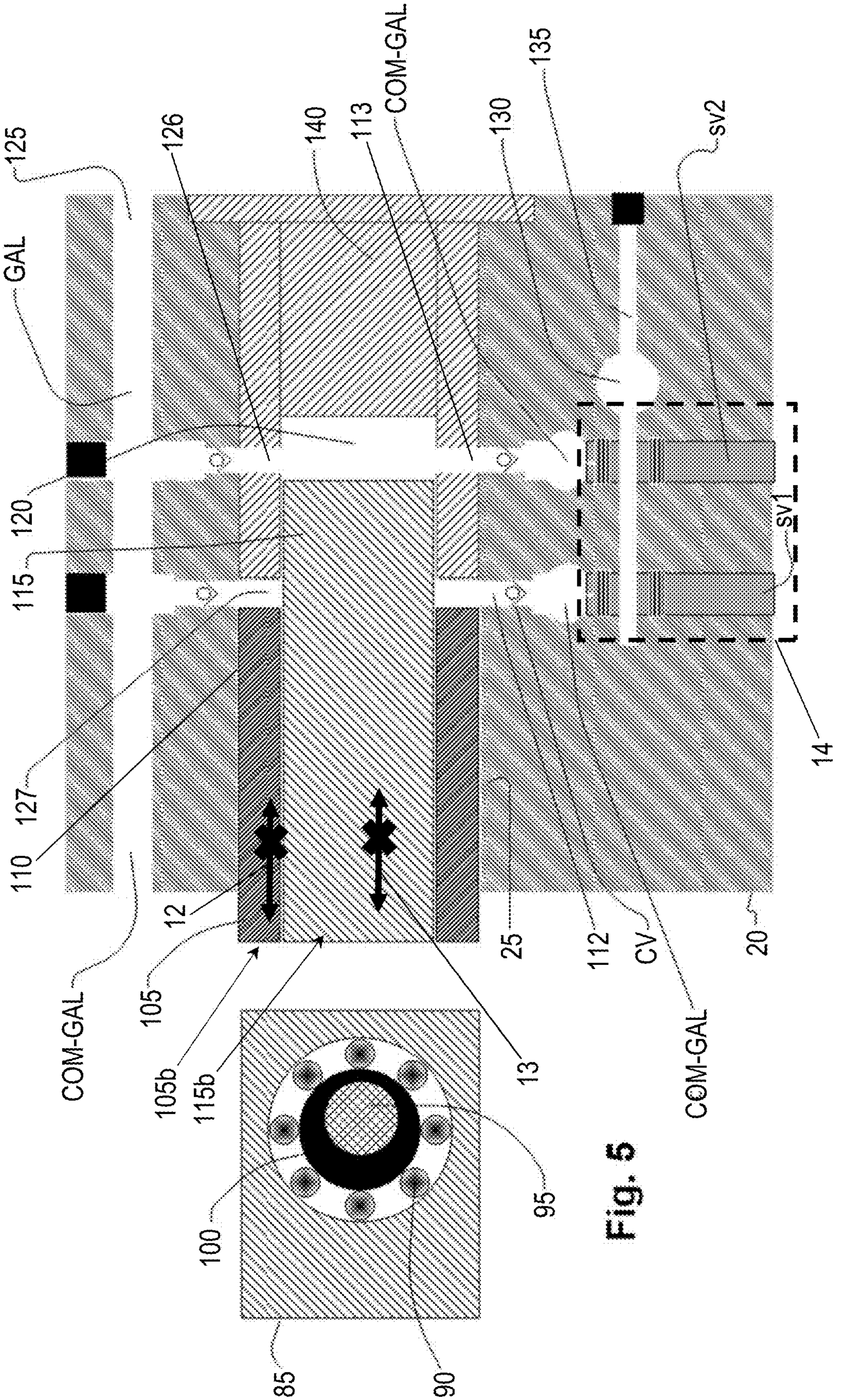
FIG. 5 is a view of the hydraulic device of FIG. 1 in a third locked state for variable displacement operation.

For example, in FIG. 4, a first flow valve SV1 (when activated—e.g. closed) can block the inflow of hydraulic fluid through the first input 112 and into the main cylinder 110. For example, a second flow valve SV2 (when activated—e.g. closed) can block the inflow of hydraulic fluid through the second input 113 and into the secondary cylinder 120. Therefore, when engaging the locking mechanism 14 by way of closing the first flow valve SV1 inhibits the first portion of the outputting of the hydraulic fluid by decoupling the main piston 105 from the actuator 85, due to a hydraulic lock provided by a vacuum formed adjacent to the end 105*a* while continued operation of the actuator 85 provides for the second portion of the outputting of the hydraulic fluid via the continued reciprocation 13 of the secondary piston 115. This occurs because the second flow valve SV2 is open and thus provides for the flow of hydraulic fluid from the second input 113 to the second output 126. In this manner, the main piston 105 becomes stopped (i.e. the reciprocal motion 12 is halted) and the secondary piston 115 continues to reciprocate 13. As shown, when the reciprocal motion 12 is halted the main piston 105 becomes decoupled from the actuator 85, i.e. the second end 105*b* losses contact with the actuator 85. As shown, when the reciprocal motion 13 is continued, the secondary piston 115 remains coupled to the actuator 85, i.e. the second end 115*b* remains in contact with the actuator 85. Both the pistons 105, 115 are shown in FIG. 4, the main piston 105 locked and in a Top Dead Center (TDC) position in the respective bore 110, and the secondary piston 115 unlocked at a Bottom Dead Center (BDC) position in the respective bore 120. In this manner, operation of the hydraulic device 20 between the TDC and BDC positions of FIGS. 1 and 4 provide for a variable displacement mode of the hydraulic device 20 (i.e. only the second output portion of the hydraulic fluid is ejected from the common output 125 while the first output portion of the hydraulic fluid is withheld from the common output 125).

Figure 3:
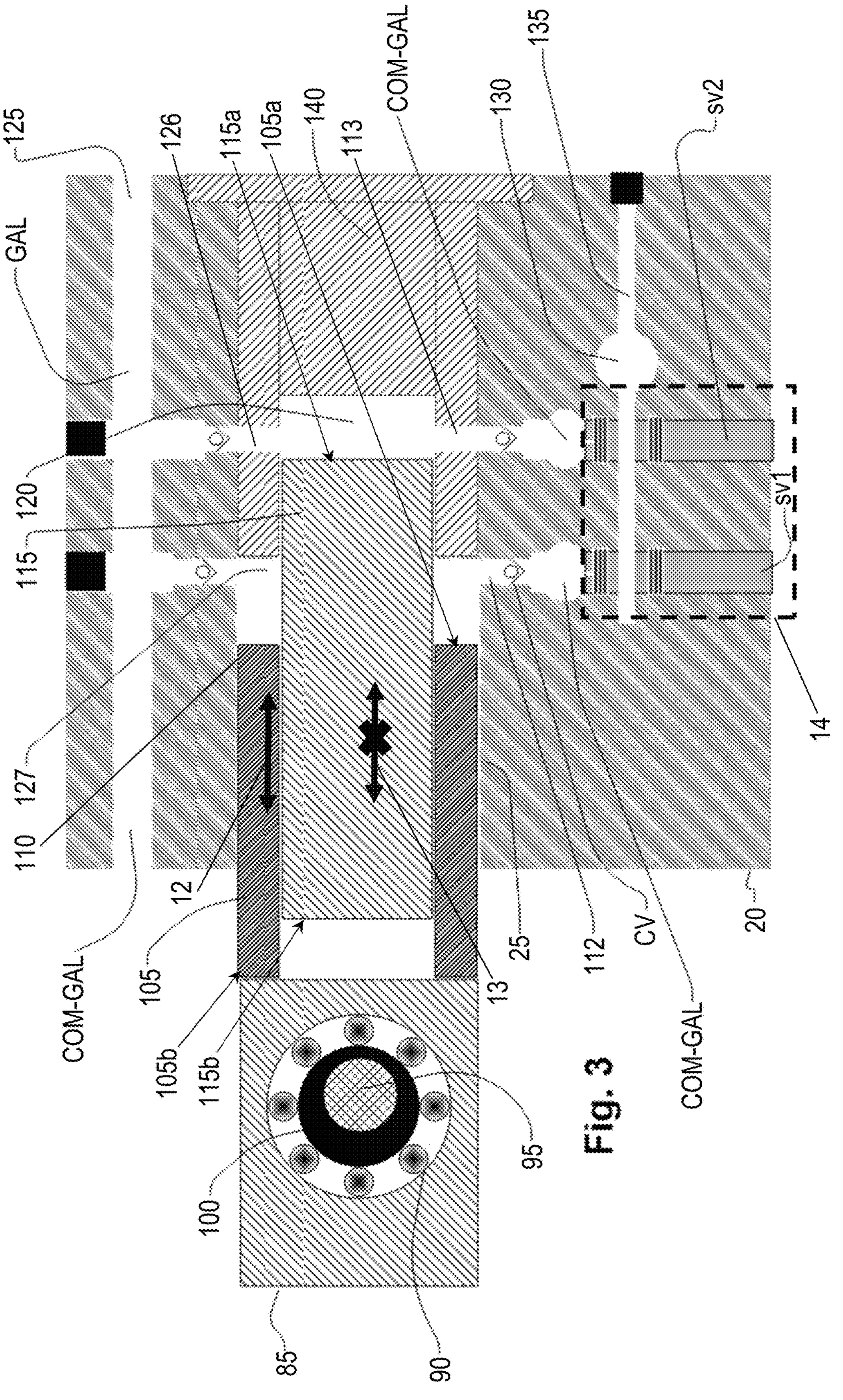
FIG. 3 is a view of the hydraulic device of FIG. 1 in a first locked state for variable displacement operation.

Referring to FIG. 3, on the contrary, when engaging the locking mechanism 14 by way of closing the second flow valve SV2 inhibits the second portion of the outputting of the hydraulic fluid by decoupling the secondary piston 115 from the actuator 85, due to a hydraulic lock provided by a vacuum formed adjacent to the end 115*a* while continued operation of the actuator 85 provides for the first portion of the outputting of the hydraulic fluid via the continued reciprocation 12 of the main piston 105. This occurs because the first flow valve SV1 is open and thus provides for the flow of hydraulic fluid from the first input 112 to the first output 127. In this manner, the secondary piston 115 becomes stopped (i.e. the reciprocal motion 13 is halted) and the main piston 105 continues to reciprocate 12. As shown, when the reciprocal motion 13 is halted the secondary piston 115 becomes decoupled from the actuator 85, i.e. the second end 115*b* losses contact with the actuator 85. As shown, when the reciprocal motion 12 is continued, the main piston 105 remains coupled to the actuator 85, i.e. the second end 105*b* remains in contact with the actuator 85. Both the pistons 105, 115 are shown in FIG. 3, the main piston 105 unlocked and in a Bottom Dead Center (BDC) position in the respective bore 110, and the secondary piston 115 locked at a Top Dead Center (TDC) position in the respective bore 120. In this manner, operation of the hydraulic device 20 between the TDC and BDC positions of FIGS. 1 and 3 provide for a variable displacement mode of the hydraulic device 20 (i.e. only the first output portion of the hydraulic fluid is ejected from the common output 125 while the second output portion of the hydraulic fluid is withheld from the common output 125).

In general, the actuator 85 includes an eccentric cam 100 driven off a main shaft 95, the eccentric cam 100 having a cam surface 86 for contacting the second main end 105*b* and the second secondary end 115*b* during the first reciprocal motion 12 and the second reciprocal motion 13. Further, the cam surface 86 can decouple from the second main end 105*b* while retaining contact with the second secondary end 115*b* when the locking mechanism 14 is locking the main piston 105. Further, the cam surface 86 can remain engaged with the second main end 105*b* while decoupling from the second secondary end 115*b* when the locking mechanism 14 is locking the secondary piston 115.

Figures 11A, 11B:
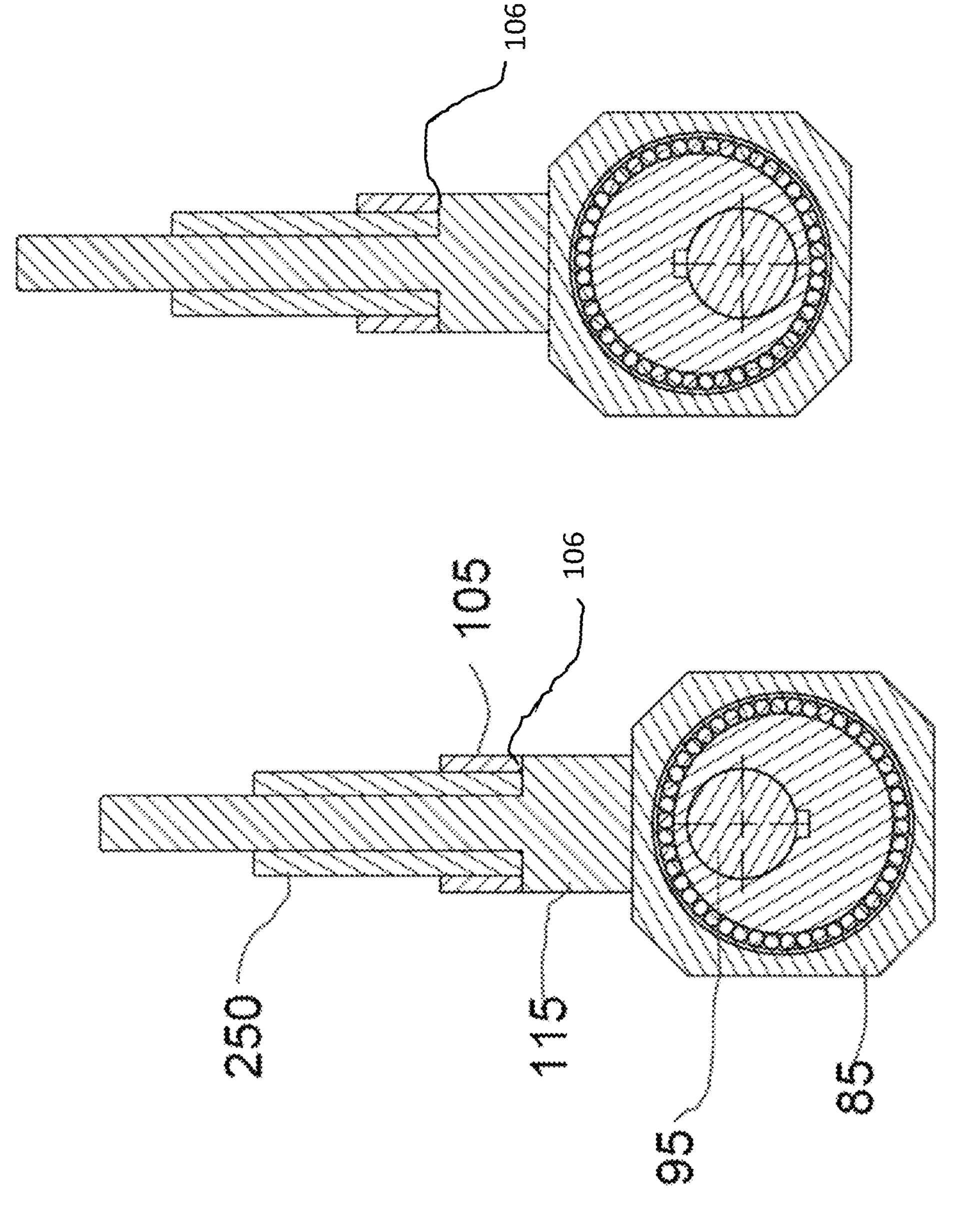
FIGS. 11A,B are a further embodiment and operation of the hydraulic device of FIGS. 1-10A.

Referring to FIGS. 11A, B, 12A,B,C, shown is a further embodiment of the coupling/decoupling between the actuator 85 and pistons 105, 115, 250 (in the case of a three piston embodiment). Note that the cylinder bores are For example, the hydraulic device 20 can have one or more inner piston(s) 115, 250 inside the outer piston 105, such that only the outer (e.g. full time) piston 105 is in contact with the actuator 85 while the inside (e.g. part time) piston(s) 115, 250 are actuated by an actuating surface 106 (e.g. abutment surface) located on the outer piston 105. Referring to FIG. 11A, shown is the actuator 85 at BDC. Shown in FIG. 11B is where all of the pistons 105, 115, 250 are operating (e.g. are all unlocked) and thus the piston 105 is pushed upwards to TDC by the actuator 85 while the pistons 115, 250 are pushed upwards to TDC by the actuating surface 106 of the piston 105.

Figures 12A, 12B, 12C:
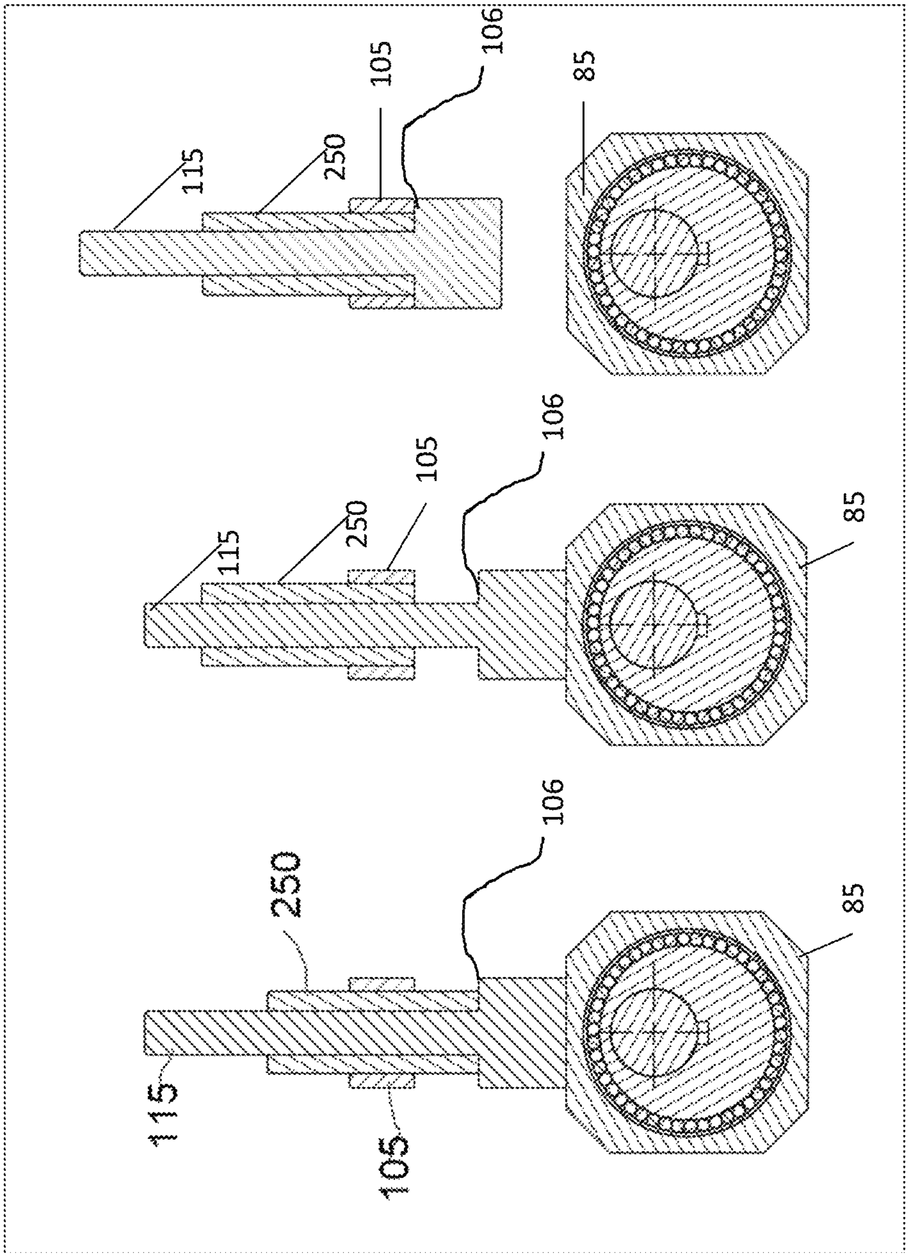
FIGS. 12A, B,C are further operations of the hydraulic device of FIGS. 11A, B.

FIG. 12A shows one example operation of the hydraulic device 20 of FIGS. 11A, B, whereby piston 105 is locked and thus decoupled from the actuating surface 106 (once pushed to TDC by the actuating surface 106), while the piston 115 continues to be actuated by the actuator 85 and the piston 250 continues to be actuated by the surface 106. FIG. 12B shows one example operation of the hydraulic device 20 of FIGS. 11A, B, whereby pistons 105,250 are locked and thus decoupled from the actuating surface 106 (once pushed to TDC by the actuating surface 106), while the piston 115 continues to be actuated by the actuator 85. FIG. 12C shows one example operation of the hydraulic device 20 of FIGS. 11A, B, whereby all pistons 105, 115, 250 are locked and thus decoupled, i.e. pistons 105, 250 from the actuating surface 106 (once pushed to TDC by the actuating surface 106) and piston 115 is decoupled from the actuator 85 (once pushed to TDC by the actuator 85).

Figure 6:
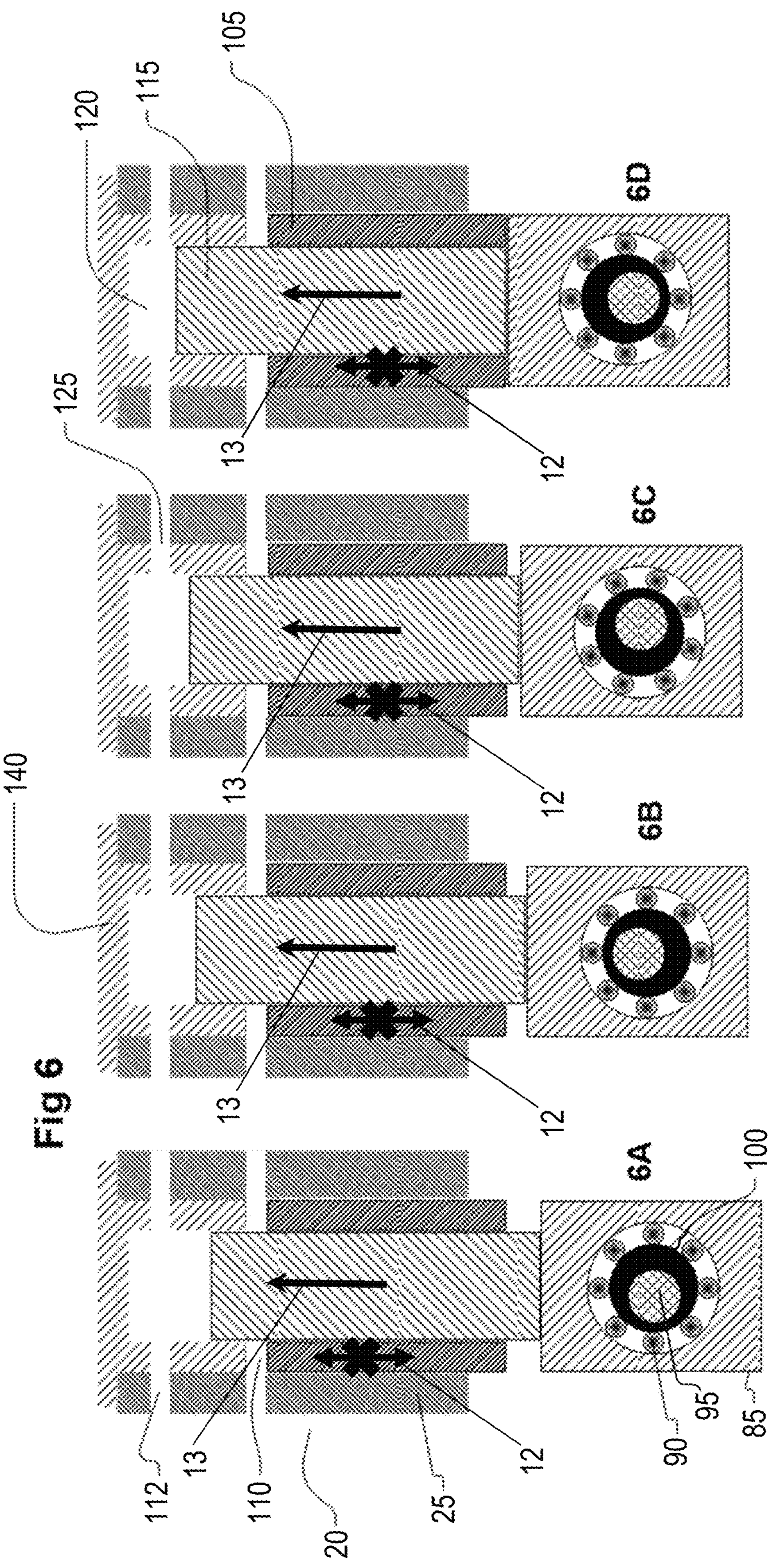
FIG. 6A,B,C,D is an example operation of the hydraulic device of FIG. 4 for variable displacement operation.

Referring to FIGS. 6A,6B,6C,6D, shown is the main piston 105 is locked at TDC and thus is decoupled from the actuator 85 (i.e. the main piston 105 remains out of contact with the surface 86 and the reciprocal motion 12 is halted), while the actuator 85 is driving the secondary piston 115 between the TDC position (see FIG. 6D) and the BDC position (see FIG. 6A). Thus, the reciprocal motion 13 in FIGS. 6A, 6B, 6C, 6D is shown progressing from BDC to TDC under influence of the actuator 85 being coupled to the secondary piston 115. Shown in FIG. 6A to FIG. 6D is an exhaust stroke for the hydraulic fluid, using the secondary piston 115. It is recognized that an intake stroke for the secondary piston 115 would be the reverse, from FIG. 6D to FIG. 6A (i.e. from TDC to BDC).

Figure 7:
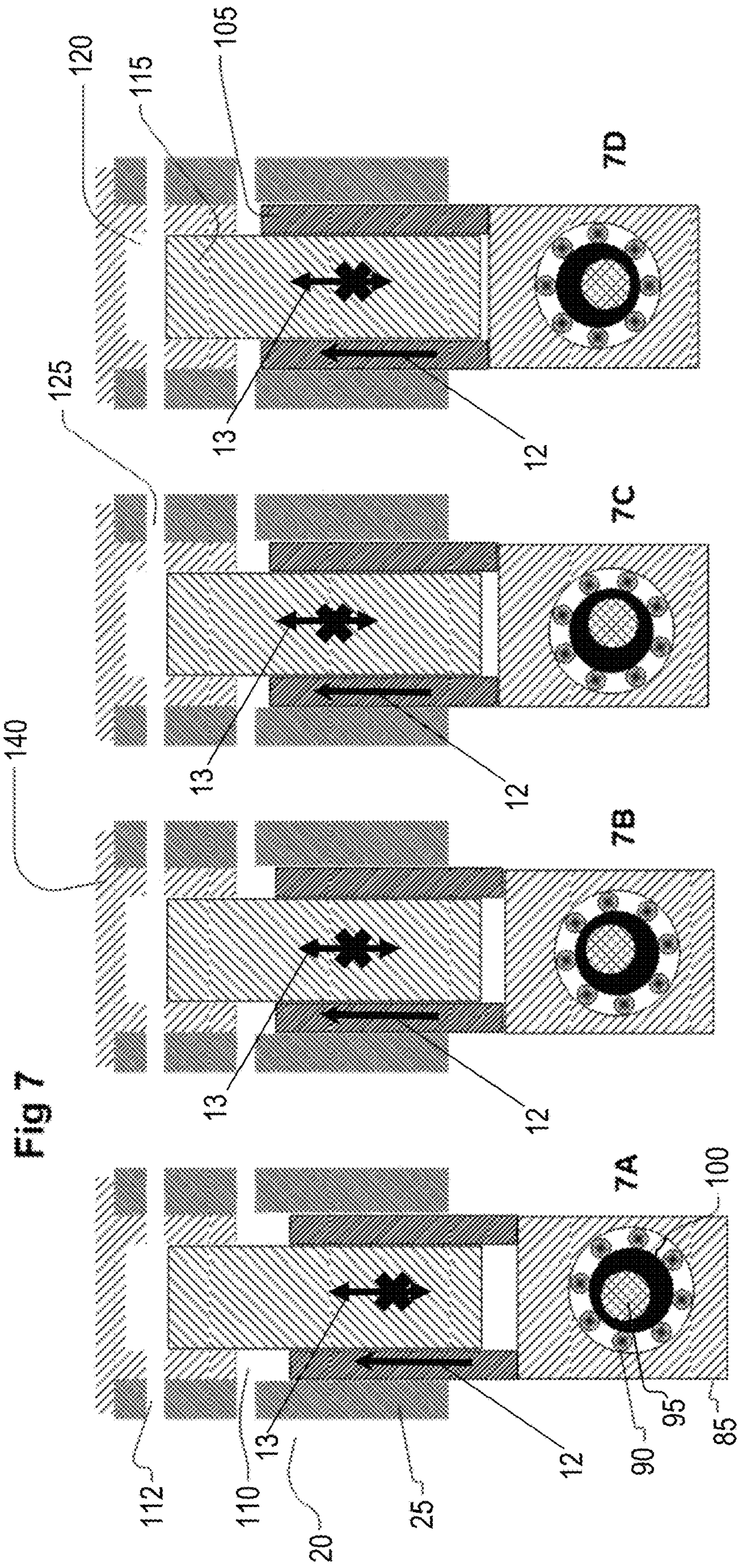
FIG. 7A,B,C,D is an example operation of the hydraulic device of FIG. 3 for variable displacement operation.

Referring to FIGS. 7A, 7B, 7C, 7D, shown is the secondary piston 115 is locked at TDC and thus is decoupled from the actuator 85 (i.e. the secondary piston 115 remains out of contact with the surface 86 and the reciprocal motion 13 is halted), while the actuator 85 is driving the main piston 105 between the TDC position (see FIG. 7D) and the BDC position (see FIG. 7A). Thus, the reciprocal motion 12 in FIGS. 7A, 7B, 7C, 7D is shown progressing from BDC to TDC under influence of the actuator 85 being coupled to the main piston 105. Shown in FIG. 7A to FIG. 7D is an exhaust stroke for the hydraulic fluid, using the main piston 105. It is recognized that an intake stroke for the main piston 105 would be the reverse, from FIG. 7D to FIG. 7A (i.e. from TDC to BDC).

Figure 8:
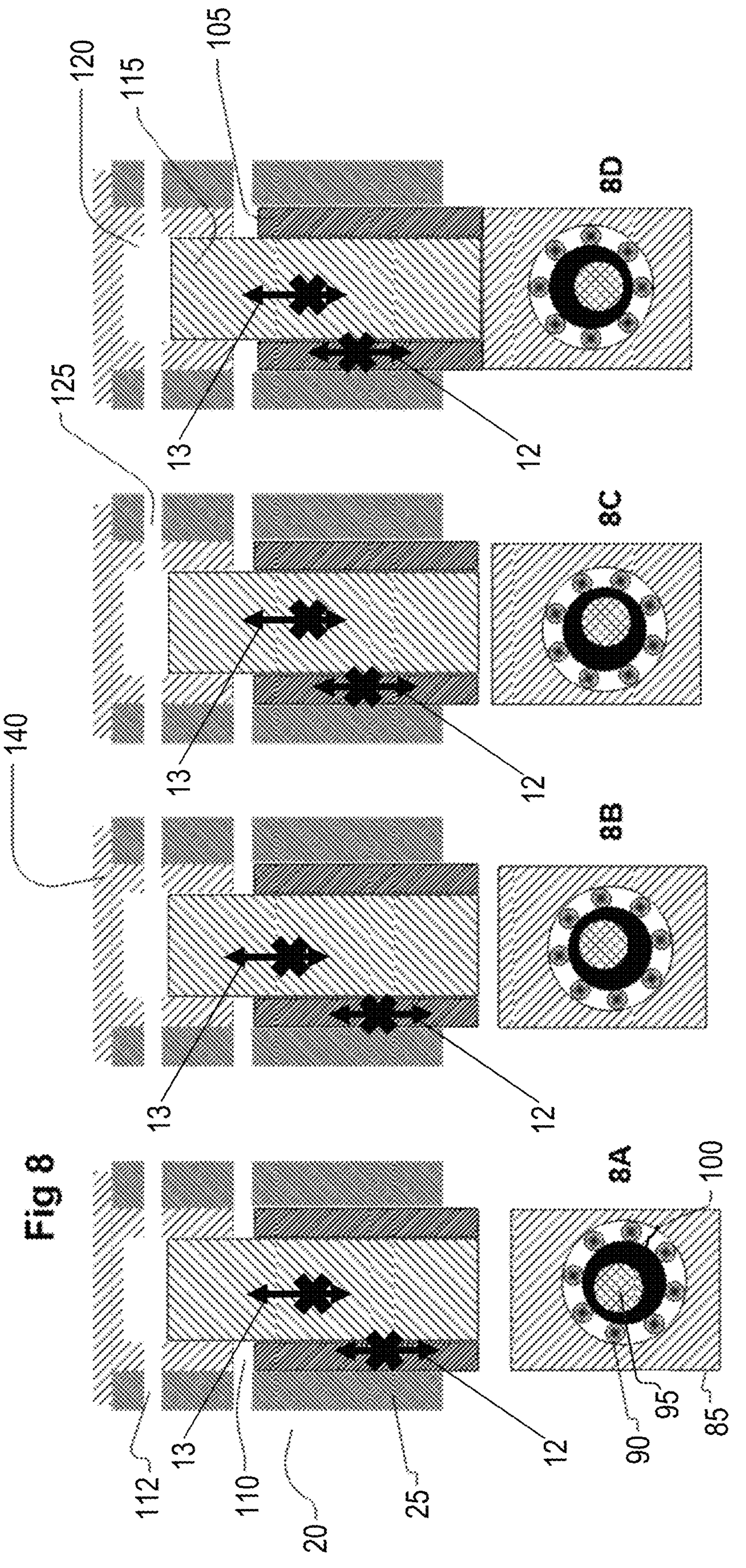
FIG. 8A,B,C,D is an example operation of the hydraulic device of FIG. 5 for variable displacement operation, also referred to as pump unload operation.

Referring to FIGS. 8A, 8B, 8C, 8D, shown are both pistons 105, 115 are locked at TDC and thus are decoupled from the actuator 85 (i.e. both pistons 105, 115 remain out of contact with the surface 86 and the reciprocal motions 12, 13 are halted), while the actuator 85 rotates between the TDC position (see FIG. 8D) and the BDC position (see FIG. 8A).

As provided above by example in FIGS. 6A,6B,6C,6D, 7A,7B,7C,7D, 8A,8B,8C,8D, to provide variable displacement for one or more of each piston pair 105,115, one (or both) of the pistons 105, 115 is/are disconnected from the actuator 85. To disconnect a piston 105,115, we truncate the injection flow into the related bore 110, 120 by simply closing off the related solenoid (e.g. flow control valve SV1, SV2). Once the flow control valve(s) SV1, SV2 is closed, the actuator 85 can always drive all pistons 105,115 to TDC, at which point, the piston 105, 115 without a new injection (having a closed flow control valve SV1, SV2) will be held at TDC by way of mechanical or vacuum lock. Once held, the piston(s) 105, 115 will become decoupled from the actuator 85 and the held piston(s) 105,115 at TDC will no longer contribute to the outlet flow volume in their respective outputs 126, 127.

It is therefore recognized that all pistons 105, 115 placed in a locked mode (e.g. by closing the respective flow control valve SV1, SV2) travel first to TDC under mechanical power by the actuator 85 and will therefore, exhaust. Lockdown takes place when pistons are held at TDC (e.g. such as by using a hydraulic vacuum lock mechanism 14, a mechanical lock mechanism 14, etc.), we cannot stop a piston 105, 115 from moving to TDC but we can inhibit piston 105, 115 travel to BDC using the locking mechanism(s) 14.

In turn, in one embodiment, re-engaging the disconnected piston(s) 105,115 to become once again coupled to the actuator 85 can be facilitated by re-opening the related flow control valve(S) SV1, SV2 to allow flow into the related bore 110, 120 via the input 112*a*, 113*a*. As the hydraulic fluid flow fills the bore 110, 120 (e.g. as driven by a charge pump), the piston(s) 105, 115 will be pushed closer to the actuator 85 in order to reengage with the actuator 85, no matter what position the actuator 85 may be during the reengagement. For example, the actuator 85 can be travelling in the same or opposite direction as the piston(s) 105, 115 during reengagement of the piston(s) 105,115. During reengagement, in one case both the piston(s) 105, 115 and the actuator 85 could both be moving towards BDC (i.e. both travelling in the same direction during the intake stroke). In this manner the piston(s) 105, 115 will recouple with the actuator 85 on their downward travel towards BDC, so that the recoupled piston(s) 105,115 will travel with the actuator 85 once again towards TDC (e.g. during the exhaust stroke). Once recoupled, the piston(s) 105, 115 continue their reciprocal motion 12, 13 until such time as their flow control valve(s) SV1, SV2 become closed once again.

During reengagement, in another case both the piston(s) 105, 115 and the actuator 85 could both be moving in opposite directions (i.e. the actuator 85 towards TDC and the piston(s) 105, 115 towards BDC during a designated exhaust stroke). In this manner the piston(s) 105, 115 will recouple with the actuator 85 on their downward travel towards BDC, as the actuator 85 comes up to meet the downward travelling piston(s) 105, 115, so that the recoupled piston(s) 105,115 will travel with the actuator 85 once again towards TDC (e.g. during the exhaust stroke, in this case a partial exhaust stroke measured from the point of reengagement somewhere between BDC and TDC). Once recoupled, the piston(s) 105,115 would continue their reciprocal motion 12,13 until such time as their flow control valve(s) SV1, SV2 become closed once again. Therefore, it is recognized in this embodiment of reengagement, the exhaust stroke of the reengaged piston(s) 105, 115 would only be a partial exhaust stroke (i.e. only a partial bore volume of oil would be ejected from the outlet 126, 127—in essence the amount of oil in the bore 110, 120 at the point where the upwards travelling actuator 85 reengages with the piston(s) 105, 115 somewhere between BDC and TDC).

It is recognized that in the case where both the piston(s) 105, 115 and the actuator 85 are moving in opposite directions, the re-engagement of the piston(s) 105, 115 to the actuator 85 is advantageously not disruptive (i.e. undesirable impact/collision between the actuator 85 and the piston(s) 105, 115) due to one or more of the following; a) layers of oil between the actuator surface 86 and the piston surface(S) 105*b*, 115*b* can act as buffer or shock absorber; b) as the piston(s) 105, 115 changes direction back towards TDC, following engagement with the upwards travelling actuator 85, the piston(s) 105, 115 will not encounter a "dead-head" condition as a small volume of oil can be released past the inlet check valve 112 while the inlet check valve is closing (e.g. latency in the closing of the check valve 112 allows for oil to be pushed back out the inlet check valve 112 at the time of reengagement of the downwards travelling piston(s) 105, 115 with the upwards travelling actuator 85). In this manner, reengagement of the piston(s) 105, 115 advantageously may not need controlled/monitored timing of the position of the actuator 85 when the flow control valve(s) SV1, SV2 is opened, e.g. disengage or re-engage timing means may not be required.

It is also recognized that in a timed operational mode, the position of the actuator 85 could be monitored (e.g. by a position sensor, by a controller based on position of the drive shaft 95, etc.) so that the flow control valve(s) SV1, SV2 would only be reopened when the actuator 85 is at the TDC position.

Referring again to FIG. 1, shown is one embodiment of the actuator 85 and the inlet 135 and the outlet 125, such that there is a common inlet oil gallery 130 and a common outlet oil gallery (e.g. 125). In this manner, a plurality of the piston pair 105, 115 and associated cylinder pair 110,120 can be connected to one another for a multi-pair hydraulic device 20. Further, each of the inlets 112, 113 have a respective entrance 112*a*, 113*a*, in order to isolate (e.g. starve) each inlet 112,113 of the multi-pair hydraulic device 20 when the respective flow control valve(s) SV1, SV2 is/are closed.

In this manner, it is recognized that each of the piston pairs 105, 115 would have a respective lock mechanism 14 (e.g. a respective set of flow control valves SV1, SV2). In this manner, each piston 105, 115 of each piston pair 105,115 can be controlled in either a locked or unlocked manner. Also, it is preferred to have valves (e.g. check valves CV) at each entrance and exit of the cylinder bores 110, 120, in order to facilitate proper flow (e.g. prevent cross talk between adjacent pairs of the pistons 105, 115) of the hydraulic fluid between the inlet 135 and the outlet 125 during operation of the hydraulic device 20. Thus, shown is a head end-cap 140, as well as the inlet and outlet check valves CV. In this manner, a first check valve CV can be positioned in the first input 112, a second check valve CV positioned in the first output 127, a third check valve CV positioned in the second input 113 and a fourth check valve CV positioned in the second output 126.

Referring again to FIG. 1, the actuator 85 can be an eccentric actuator mounted on a main shaft 95, such that an offset cam 100 (mounted on the shaft 95) drives the actuator 85 (with surface 86) as the main shaft 95 rotates (e.g. is driven by a primary mover such as an electric motor—not shown). Further, a set of bearings 90 (e.g. roller bearings)

can be positioned between the actuator block 85 and the offset cam 100. In this manner, as the shaft 95 rotates, the offset cam 100 moves the actuator block 85 between the TDC and the BDC positions. Further, as noted above by example, the piston(s) 105, 115 are shown locked in their TDC position. It is recognized that unlocking of the flow control valve(s) SV1, SV2 could be timed off the main shaft 95 (or remain untimed as discussed above as one embodiment) so that the unlocking of a locked piston would coincide with the proper positioning of the actuator block 85 (i.e. the surface 86 would be in position adjacent to the end 105*b*, 115*b* at TDC) when the respective flow control valve SV1, SV2 is unlocked. Alternatively, in the untimed mode, there is no need to time the position of the actuator 85 on reengaging with the piston(s) 105, 115 after lockdown, which would result in the partial exhaust stroke on reengagement of the piston(s) with the actuator 85.

Referring to FIGS. 10A, B, shown is a further embodiment of the hydraulic device 20, such that the housing 25 has a pair of inlets 112, 113 and a pair of outlets 126,127, such that each piston 105, 115 has a respective individual inlet 112, 113 and a respective individual outlet 127, 126. In this manner, the output flows (e.g. first portion and second portion) are separate from one another and thus can remain separate or otherwise combined exterior to the housing 25. In FIG. 10A, both pistons 105, 115 are at BDC and are starting an exhaust stroke. In FIG. 10B, both pistons 105, 115 are at TDC and are thus at the end of their exhaust strokes, resulting in a first portion of the hydraulic fluid output exiting the first outlet 127 and a second portion of the hydraulic fluid output exiting the separate (from the first outlet 127) second outlet 126.

Figure 13:
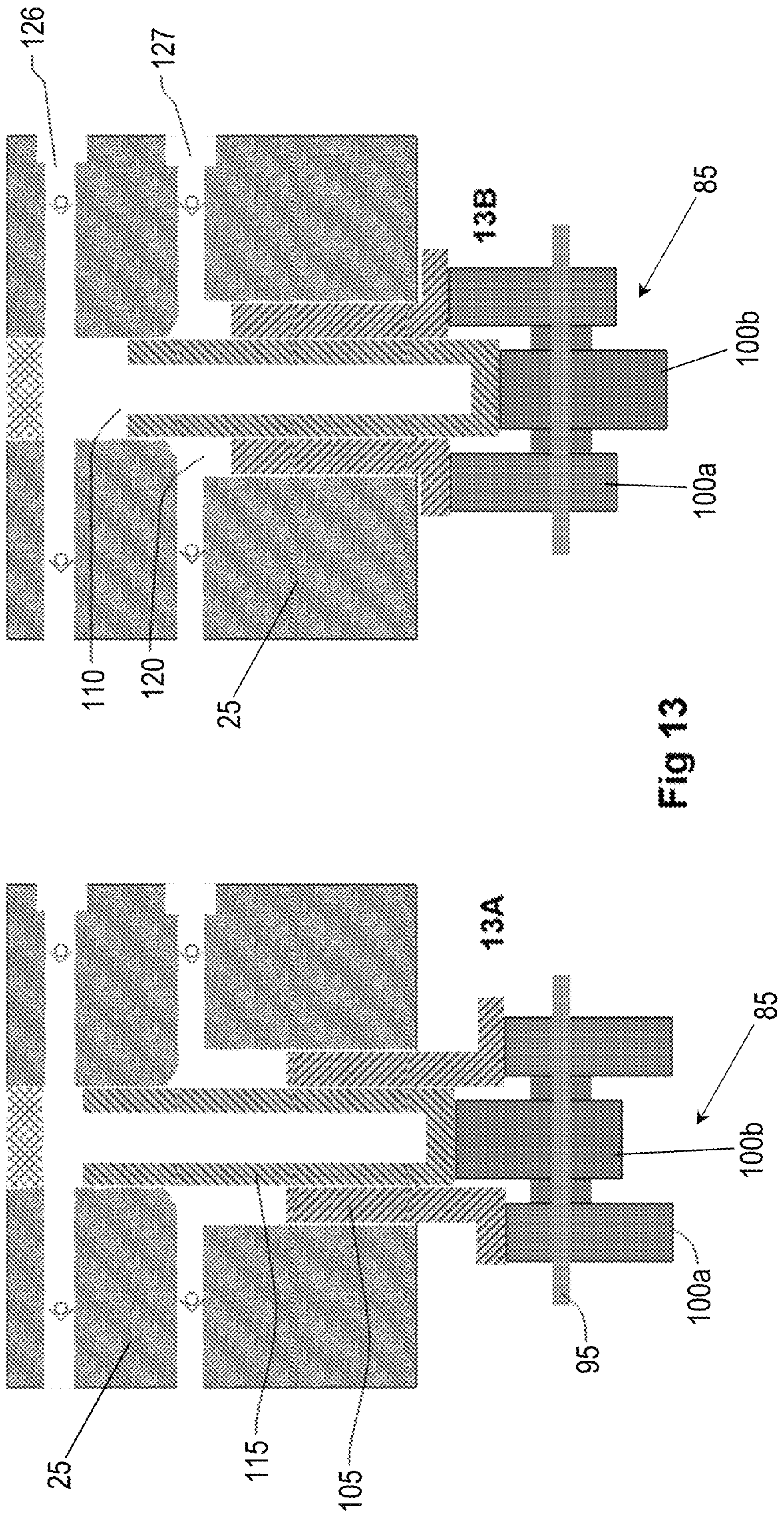
FIGS. 13A, B, 14A,B and 15A,B are further examples of the cam of FIG. 1.

In general it is recognized that the actuator 85 can include an eccentric cam 100 driven off the shaft 95, the eccentric cam 100 having a first cam surface 100*a* for contacting the second main end 105*a* and a second cam surface 100*b* for contacting the second secondary end 115*b* during the first reciprocal motion 12 and the second reciprocal motion 13, such that the first cam surface 100*a* is offset from the second cam surface 100*b*. Referring to FIGS. 13A, B, shown is a further embodiment of the actuator 85, having an offset cam having a first cam 100*a* offset (e.g. by 180 degrees) from a second cam 100*b*, such that both the first cam 100*a* and the second cam 100*b* are mounted on the same shaft 95. In this manner, as the cams 100*a*, 100*b* rotate, the pistons 105,115 alternate separately between their TDC and BDC positions. For example, when offset by 180 degrees, the main piston 105 would be at BDC when the secondary piston 115 is at TDC, see FIG. 13A. Once the cams 110*a*, 100*b* are further rotated by the shaft 95, then the positions of the pistons 105, 115 would eventually switch, i.e. the main piston 105 would be at TDC when the secondary piston 115 is at BDC, see FIG. 13B. As shown in FIG. 13A, B, the locking mechanism 14 (see FIG. 2) is unactivated (both flow valves SV1 and SV2 are open) and thus both pistons 105, 115 are reciprocating 12,13 as the drive shaft 95 rotates.

Figure 14:
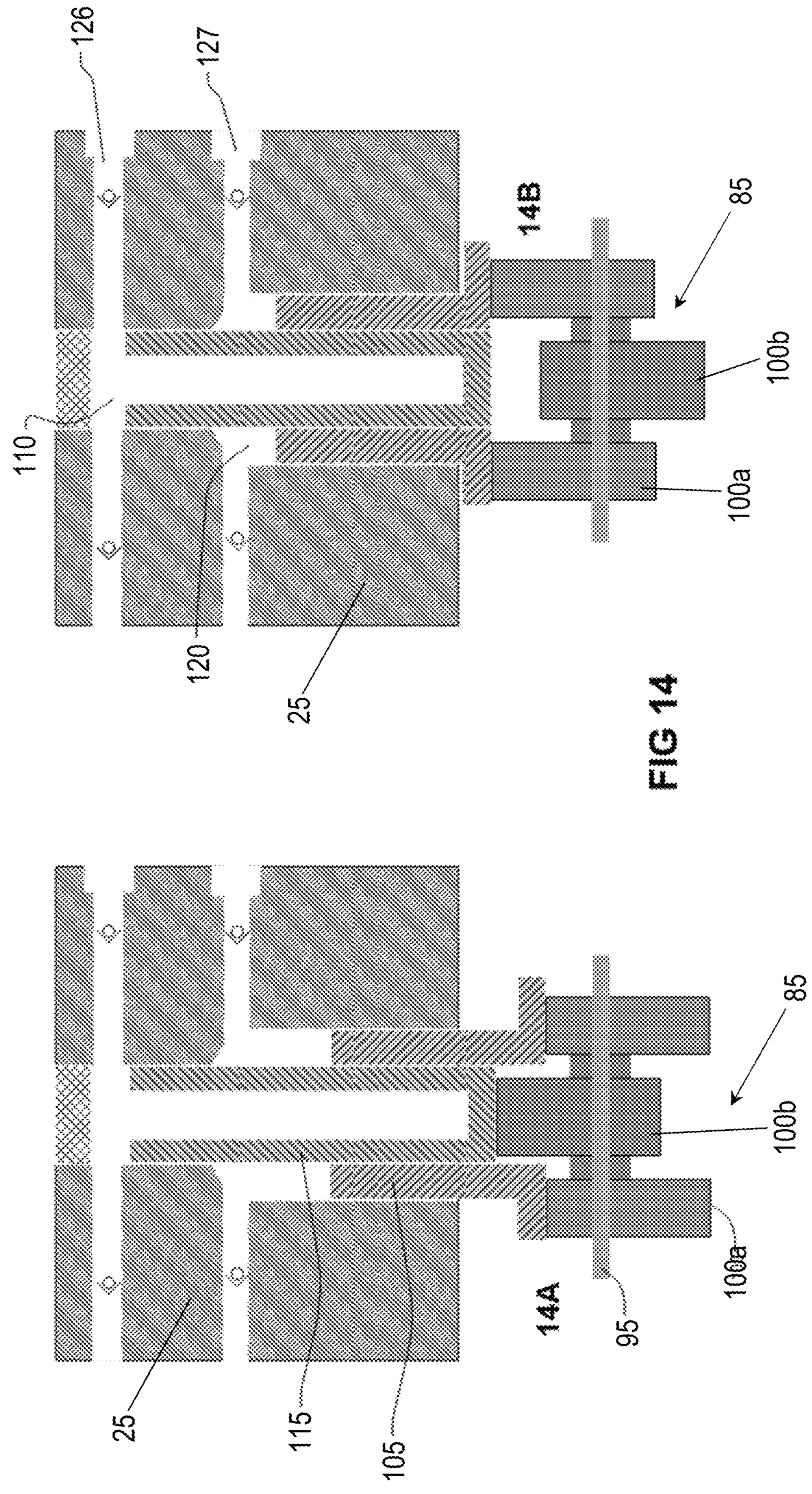

Referring to FIGS. 14A, B, shown is the further embodiment of the actuator 85, having the offset cam having the first cam 100*a* offset (e.g. by 180 degrees) from the second cam 100*b*, such that both the first cam 100*a* and the second cam 100*b* are mounted on the same shaft 95. In this manner, the pistons 105,115 can be alternated between their TDC and BDC positions. As shown in FIG. 14A, B, the locking mechanism 14 (see FIG. 3) is activated (flow valve SV1 is open and flow valve SV2 is closed) and thus the main piston 105 is reciprocating 12 as the drive shaft 95 rotates while the secondary piston 115 remains locked (i.e. held in position at TDC). For example, when offset by 180 degrees, the main piston 105 is at BDC when the secondary piston 115 is held at TDC, see FIG. 14A. Once the cams 110*a*, 100*b* are further rotated by the shaft 95, then the position of the main piston 105 would change, i.e. the main piston 105 would be at TDC while the secondary piston 115 remains stationary at TDC (and is decoupled from the cam 110*b*), see FIG. 14B.

Figure 15:
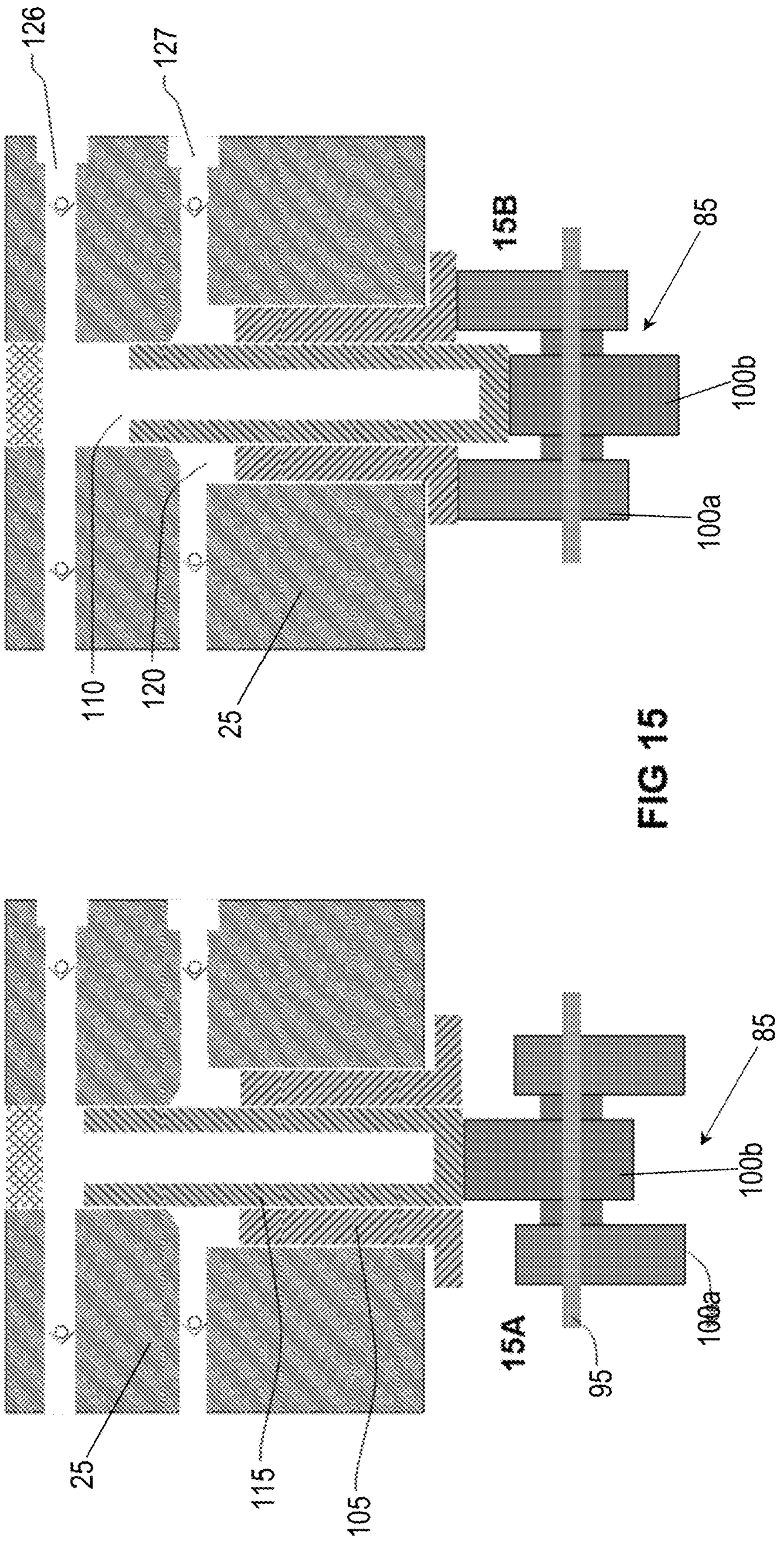

Referring to FIGS. 15A, B, shown is the further embodiment of the actuator 85, having the offset cam having the first cam 100*a* offset (e.g. by 180 degrees) from the second cam 100*b*, such that both the first cam 100*a* and the second cam 100*b* are mounted on the same shaft 95. In this manner, the pistons 105,115 can be alternated between their TDC and BDC positions. As shown in FIG. 15A, B, the locking mechanism 14 (see FIG. 4) is activated (flow valve SV1 is closed and flow valve SV2 is open) and thus the secondary piston 115 is reciprocating 13 as the drive shaft 95 rotates while the main piston 105 remains locked (i.e. held in position at TDC). For example, when offset by 180 degrees, the secondary piston 115 is at TDC when the main piston 105 is held at TDC, see FIG. 15A. Once the cams 110*a*, 100*b* are further rotated by the shaft 95, then the position of the secondary piston 115 would change, i.e. the secondary piston 115 would be at BDC while the main piston 115 remains stationary at TDC (and is decoupled from the cam 110*a*), see FIG. 15B.

In view of the above, it is recognized that the hydraulic device 20 can be a pump as shown or can also be a motor. In a motor mode of the hydraulic device 20, the reciprocation(s) 12,13 of the piston(s) 105, 115 would drive the rotation of the shaft 95 by the respective end(s) 105*b*, 115*b* driving the contact surface(s) 86. In this manner, the input of the hydraulic fluid into the input(s) 112, 113 would be used to drive the reciprocation(s) 12, 13 and thus the rotation of the shaft 95. It is therefore recognized in the motor mode that variable displacement (e.g. using the locking mechanism 14 as described above) could be used by the hydraulic device 20 to moderate the torque and/or speed of the motor operation, as desired.

Further, it is recognized in the above that the pistons 110, 115 have a fixed stroke length when reciprocating in their respective bores (i.e. cylinders 110,120). As such, a distance between a Top Dead Center TDC and Bottom Dead Center BDC remains constant when the locking mechanism 14 (e.g. flow control valves SV1,SV2) is operated between a closed/locked state and an open/unlocked state. The position TDC can be defined as when the piston 110, 115 reaches the end of the exhaust stroke for ejecting fluid out of the cylinder 110, 120, and thus the beginning of the intake stroke for injecting fluid into the cylinder 110, 120. The position BDC can be defined as when the piston 110, 115 reaches the end of the intake stroke for injecting fluid into the cylinder 110, 120, and thus the beginning of the exhaust stroke for ejecting fluid out of the cylinder 110, 120. The configuration of the piston 105—cylinder 110 and piston 115—cylinder 120 arrangements can be referred to as an axial configuration.

Figure 16:
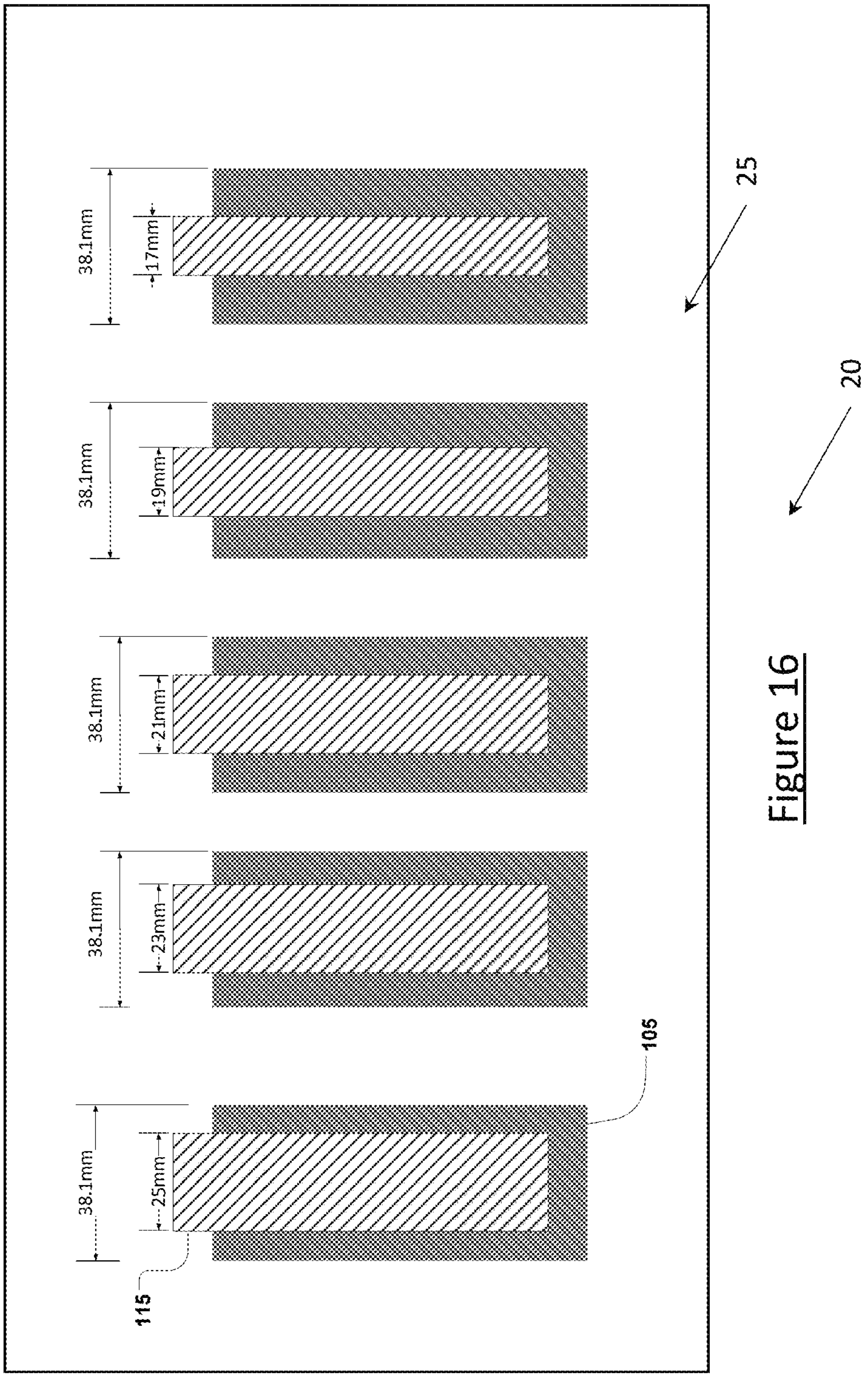
FIGS. 16, 17 are examples of the hydraulic device of FIGS. 1-15A,B having multiple piston-cylinder pairs/triplets, some of which being of different diameter bores.
Figure 17:
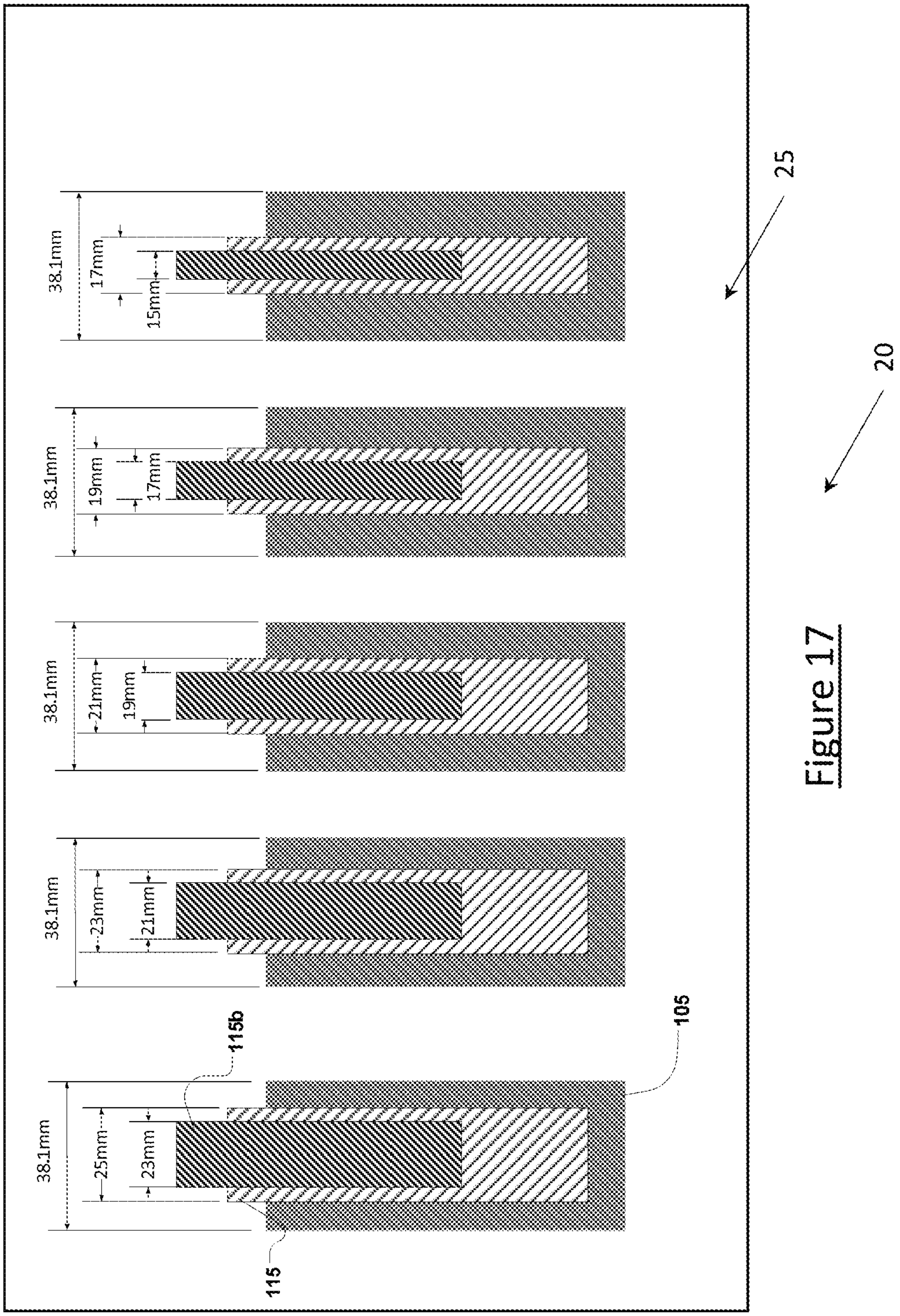

Referring to FIGS. 16,17, shown are embodiments of the hydraulic device 20 having a plurality of piston 105—cylinder 110 and piston 115—cylinder 120 arrangements. For example, it is envisioned that the hydraulic device 20 can have any number of piston-cylinder arrangements, e.g. 5, 7, 9, etc.

Further, it is also recognized that each internal piston 115 (or a multi piston device 20) can be of different surface area than the next one, which could provide for allows for the outlet flow reduction (i.e. variable displacement) to be nonlinear.

Referring to FIG. 16, shown is the housing 25 of the hydraulic device 20 having conceptually a plurality of pairs of pistons, such that each pair of pistons includes the outer piston 105 and the inner piston 115. It is recognized that one or more of the pairs of pistons 105, 115 can have different diameters (with corresponding bores), the differing numerical sizes of the pistons 105, 115 shown by example only. In this manner, depending upon which piston(s) 105, 115 is/are decoupled from the actuator 85 (not shown in FIG. 16 for simplicity, rather see FIG. 1 for an example of the actuator 85), the hydraulic device 20 could have a selected difference in the variable displacement provided. For example, it is recognized that decoupling the 17 mm inner piston 115 would subtract less from the total output of the hydraulic device 20 (in the case of a pump) than in the case of decoupling the 21 mm piston 115. In this manner, not only the decision to decouple a piston 115 (or corresponding piston 105 for that matter) can be made by the operator of the hydraulic device 20, but also the size of the piston 105, 115.

Referring to FIG. 17, shown is an alternative embodiment of the hydraulic device 20 having multiple trio-sets of pistons, namely piston 105 is the outer most piston, piston 115 is the intermediate piston and the piston 115B is the inner most piston. Shown in FIG. 17 is a plurality of different sizes of the pistons 105, 115, 115B, however it is also recognized that similar sized pistons 105, 115, 115B can be provided, as desired (e.g. similar to the embodiment of FIG. 1 for pairs 105, 115 of pistons). As such, each piston 115 and piston 115B can be of a different bore diameter to each other. In other words, a piston 115B of diameter 21 mm will, per revolution, displace a lesser volume than piston 115B of 23 mm and so forth. Similarly piston 115 of 23 mm will, per revolution, displace a lesser volume than piston 115 of 25 mm and so forth.

Figure 18:
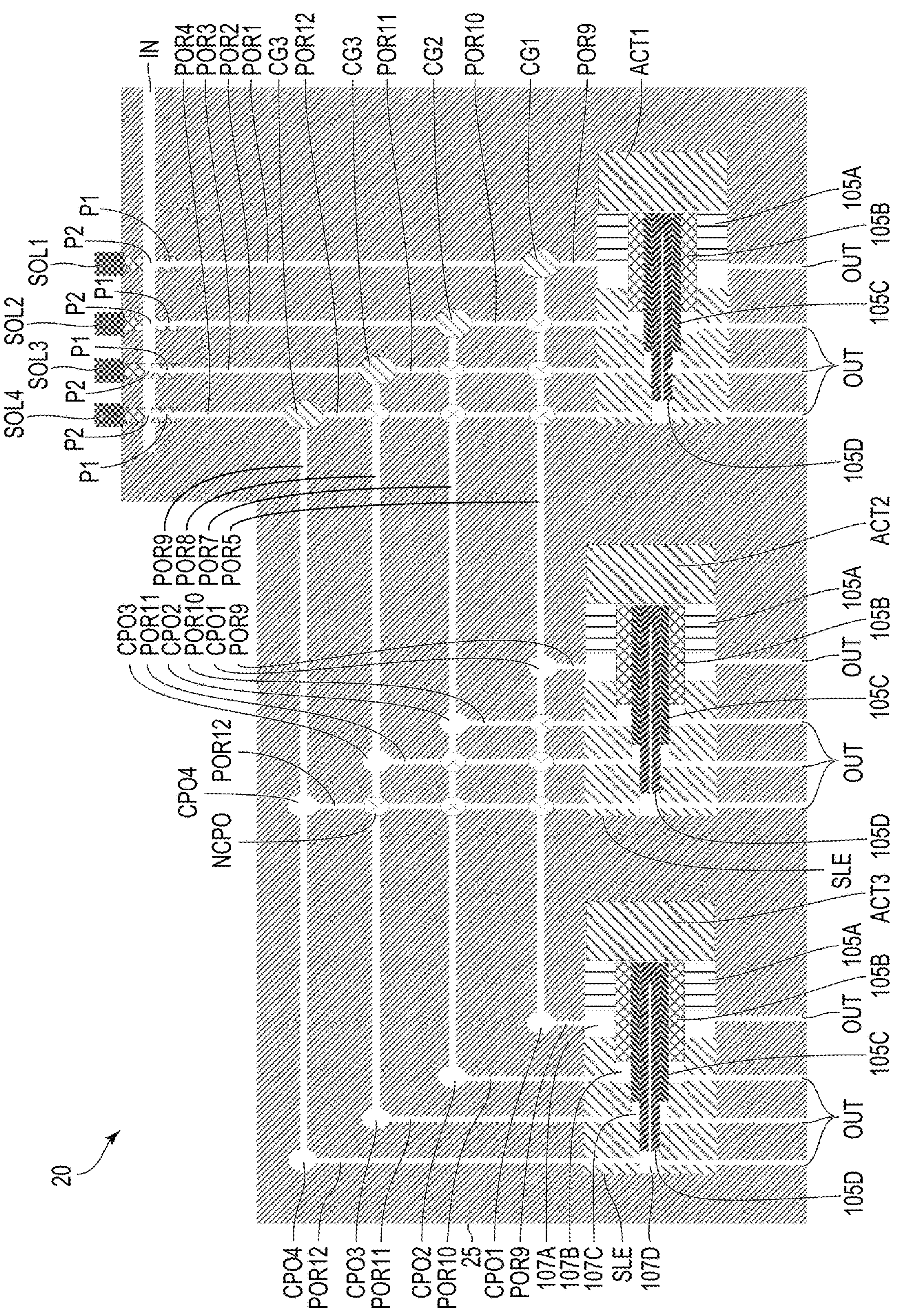
FIG. 18 is a further alternative embodiment of the hydraulic device of FIG. 1.

Referring to FIG. 18, shown is an alternative embodiment of the hydraulic device 20 (e.g. configured as a hydraulic pump). The hydraulic device 20 has multiple sets of piston in pistons 105A, B,C, D, for example three sets shown in the housing 25. For example, each set of pistons (e.g. nested pistons) has an outer piston 105A, a first piston 105B positioned inside the outer piston 105A, a second piston 105C positioned inside the first piston 105B and a third piston 105D positioned within the second piston 105C. Each of the pistons is positioned within a corresponding bore 107A, 107B, 107C, 107D, such that at least a portion of bore 107B is within the outer piston 105A, at least a portion of bore 107C is within the first piston 105B, and at least a portion of bore 107D is within the second piston 105C. The bore 107A is within the housing 25. it is recognized that the bores 107A,B,C,D are not in fluid communication with one another, rather any fluid communication between the bores 107A,B,C,D of the same piston set 105A,B,C,D is inhibited by the bodies of the intervening pistons 105A,B,C,D.

Each of the pistons 105A, 105B, 105C, 105D are configured to reciprocate axially along the reciprocation axis 11, see FIG. 1, in conjunction with the actuator ACT1, ACT2, ACT3. It is recognized that each set of piston in pistons 105A,B,C,D has a corresponding shared actuator ACT1,2,3 (e.g. each actuator ACT1,ACT2,ACT3 drives/is driven with respect to the set of pistons 105A,B,C,D). Not shown is FIG. 18 for the purpose of ease of portrayal only, is the shaft 95 and cam 100 (see FIG. 1) as part of the actuators ACT1, ACT2, ACT3. For example, each actuator ACT1,2,3 is driven off the same shaft 95 by a respective cam 100 (not shown). SLE refers to the set of piston bores 107A,B,C,D.

Referring again to FIG. 18, the bores 107A,B,C,D are not in fluid communication with one another, rather any fluid communication between the bores 107A,B,C,D of the same piston set 105A,B,C,D is inhibited by the bodies of the intervening pistons 105A, B,C,D. For example, the body of first piston 105B is positioned during its reciprocation such that the body of the first piston 105B inhibits fluid communication between the bore 107A and the bore 107B (recognizing that piston seals—not shown—between the pistons 105A,B,C,D and the walls of the respective bores 107A,B,C,D can also thus facilitate the inhibition of fluid communication between the bores 107A,B,C,D). Further, the body of second piston 105C is positioned during its reciprocation such that the body of the second piston 105C inhibits fluid communication between the bore 107B and the bore 107C. Further, the body of third piston 105D is positioned during its reciprocation such that the body of the third piston 105D inhibits fluid communication between the bore 107C and the bore 107D.

Referring again to FIG. 18, it is recognized that there is a set of shared control valves (e.g. solenoids) SOL1, SOL2, SOL3, SOL4, which is different from the individual (e.g. unshared) control valves SV1, SV2 embodiment of FIG. 1. In FIG. 18, for example, the reciprocation of a selected piston from each set of pistons 105A, B,C,D is controlled by a shared control valve SOL1, SOL2, SOL3, SOL4. For example, control valve SOL1 controls the reciprocation state (locked or unlocked) of all outer pistons 105A, such that operation of the flow control valve SOL1 either locks all outer pistons 105A from all the sets of pistons 105A,B,C,D or unlocks all outer pistons 105A from all the sets of pistons 105A, B,C,D. For example, control valve SOL2 controls the reciprocation state (locked or unlocked) of all first pistons 105B, such that operation of the flow control valve SOL2 either locks all first pistons 105B from all the sets of pistons 105A,B,C,D or unlocks all first pistons 105B from all the sets of pistons 105A, B,C,D. For example, control valve SOL3 controls the reciprocation state (locked or unlocked) of all second pistons 105C, such that operation of the flow control valve SOL3 either locks all second pistons 105C from all the sets of pistons 105A, B,C,D or unlocks all second pistons 105C from all the sets of pistons 105A, B,C,D. For example, control valve SOL34 controls the reciprocation state (locked or unlocked) of all third pistons 105D, such that operation of the flow control valve SOL4 either locks all third pistons 105D from all the sets of pistons 105A, B,C, D or unlocks all third pistons 105D from all the sets of pistons 105A,B,C,D.

In the manner described above, it is recognized that each flow control valve SOL1, SOL2, SOL3, SOL4 controls two or more pistons 105A, 105B, 105C, 105D, such that the two or more pistons 105A, 105B, 105C, 105D controlled are from different sets of pistons 105A, B,C,D. This configuration is different form the hydraulic device 20 shown in FIG. 1, whereby each flow control valves SV1, SV2 only controls one respective piston 105, 115. In this manner, the flow control valves SOL1, SOL2, SOL3, SOL4 are configured in a one to many setup (e.g. one flow control valve for many pistons) while the flow control valves SV1, SV2 are configured in a one to one setup (e.g. one flow control valve for one piston).

Referring again to FIG. 18, the passage IN is a common gallery for the housing 25 whereby hydraulic fluid is either facilitated to enter the bore 107A,B,C,D by the respective flow control valves SOL1, SOL2,SOL3,SOL4 (e.g. in an open/unlocked state) or is either restricted from entering the bore 107A,B,C,D by the respective flow control valves SOL1, SOL2, SOL3, SOL4 (e.g. in a closed/locked state). In other words, the passage IN can be referred to as an inlet or feed port for the hydraulic device 20. Further, P1 represents the outlet port for each of the flow control valves SOL1, SOL2, SOL3, SOL4 while P2 represents the inlet port for each of the flow control valves SOL1, SOL2, SOL3, SOL4 (e.g. when a flow control valve SOL1, SOL2, SOL3, SOL4 is closed/locked, hydraulic oil is inhibited from flowing through its inlet port P2 and out of its outlet port P1).

Referring again to FIG. 18, POR1, POR2, POR3, POR4 are the respective inlet passages connecting the respective outlet port P1 of each of the flow control valves SOL1, SOL2, SOL3,SOL4 with a respective common gallery CG1, CG2,CG3,CG4. For example, passage POR1 is used to direct hydraulic oil from the outlet port P1 of flow control valve SOL1 to each of the bores 107A of the outer pistons 105A. For example, passage POR2 is used to direct hydraulic oil from the outlet port P1 of flow control valve SOL2 to each of the bores 107B of the outer pistons 105B. For example, passage POR3 is used to direct hydraulic oil from the outlet port P1 of flow control valve SOL3 to each of the bores 107C of the outer pistons 105C. For example, passage POR4 is used to direct hydraulic oil from the outlet port P1 of flow control valve SOL4 to each of the bores 107D of the outer pistons 105D.

Further to the above, respective passages POR5,6,7,8 are used to direct hydraulic fluid from the respective common galleries CG1,2,3,4. For example, hydraulic fluid entering from passage POR1 into common gallery CG1 then exits into passage POR5. For example, hydraulic fluid entering from passage POR2 into common gallery CG2 then exits into passage POR6. For example, hydraulic fluid entering from passage POR3 into common gallery CG3 then exits into passage POR7. For example, hydraulic fluid entering from passage POR4 into common gallery CG4 then exits into passage POR8.

Further, the respective passages POR5,6,7,8 fluidly connect each respective common gallery CG1,2,3,4 with a respective passage connecting point CPO1,2,3,4. It is recognized that the passage connecting point CPO1,2,3,4 provides for fluid communication between adjacent passages POR9,10,11,12 (e.g. passage connecting points CPO1 fluidly connect passage POR5 with passages POR9, passage connecting points CPO2 fluidly connect passage POR6 with passages POR10, passage connecting points CPO3 fluidly connect passage POR7 with passages POR11, passage connecting points CPO4 fluidly connect passage POR8 with passages POR12).

Further, the common gallery CG1 can be used to connect the respective passage POR1 with a respective passage POR9, thus functioning as a fluid connecting point. Further, the common gallery CG2 can be used to connect the respective passage POR2 with a respective passage POR10, thus functioning as a fluid connecting point. Further, the common gallery CG3 can be used to connect the respective passage POR3 with a respective passage POR11, thus functioning as a fluid connecting point. Further, the common gallery CG4 can be used to connect the respective passage POR4 with a respective passage POR12, thus functioning as a fluid connecting point.

Referring again to FIG. 18, each of the symbols referenced by the reference indicator NCPO refers to a non-connecting point, such that the crossed passages are not in fluid communication with one another within the housing 25. For example, the symbol NCPO shown indicates that the passage POR7 is not in fluid communication with the passage POR12, the passage POR6 is not in fluid communication with the passages POR11,12, etc.

In view of the above, the respective common galleries CG1,2,3,4 direct hydraulic fluid to each of their respective connecting points CG1,2,3,4. For example, common gallery CG1 fluidly communicates with all the connecting points CPO1, common gallery CG2 fluidly communicates with all the connecting points CPO2, common gallery CG3 fluidly communicates with all the connecting points CPO3, and common gallery CG4 fluidly communicates with all the connecting points CPO4. Also, via the respective connecting points CPO1,2,3,4, each of the respective common galleries CG1,2,3,4 fluidly communicates with the respective passages POR9, 10,11,12.

Further, each OUT is an outlet passage from the various sets of pistons 105A,B,C,D. It is recognized that in operation of the hydraulic device 20 of FIG. 18, each of the flow control valves SOL1,SOL2, SOL3, SOL4 can be normally opened (e.g. de-energized) so supply hydraulic fluid can fill all bores 107A, B,C,D (in the case of a hydraulic pump). If one (or more) of the flow control valves SOL1, SOL2,SOL3, SOL4 is closed (e.g. energized), hydraulic fluid flow to all related bores is truncated. For example, if the flow control valve SOL1 is closed then hydraulic fluid cannot flow to all the bores 107A for all the outer pistons 105A. For example, if the flow control valve SOL2 is closed then hydraulic fluid cannot flow to all the bores 107B for all the first pistons 105B. For example, if the flow control valve SOL3 is closed then hydraulic fluid cannot flow to all the bores 107C for all the second pistons 105C. For example, if the flow control valve SOL4 is closed then hydraulic fluid cannot flow to all the bores 107D for all the third pistons 105D. It is recognized that one or more of the flow control valves SOL1, SOL2, SOL3, SOL4 can be closed at the same time. It is recognized that one or more of the flow control valves SOL1, SOL2, SOL3, SOL4 can be open at the same time.

Further, when referring to FIG. 18 for the hydraulic device 20 as a hydraulic motor, each of the inlets (e.g. IN, P2) would function as an outlet and each of the outlets (e.g. OUT, P1) could function as an inlet. Further, it is recognized that the rotation of the driveshaft 95 can be reversible, i.e. done is a clockwise or in counterclockwise rotation as desired.

Further, it is recognized that a further embodiment, not shown, is where the configuration of flow control valves SV1, SV2 of FIG. 1 and the configuration of the flow control valves SOL1, SOL2, SOL3, SOL4 is mixed. For example, in FIGS. 1, 16, each of the outer pistons 105 could be controlled by a respective flow control valve SV1 (e.g. a one control valve SV1 to one piston 105 configuration for each set of pistons). Additionally, in FIGS. 1, 16, all of the inner pistons 115 could be controlled by a shared flow control valve SOL2 (e.g. a one control valve SOL2 to many pistons 115 configuration for each set of pistons).

Further, it is recognized that the flow control valves SOL1, SOL2, SOL3,SOL4 can be referred to as one example of a locking mechanism (e.g. a hydraulic locking mechanism). As such it is recognized that any/all of the flow control valves SOL1, SOL2, SOL3, SOL4 could be substituted for a mechanical locking mechanism type, such as shown by example in FIGS. 9A-F).

Figure 19:
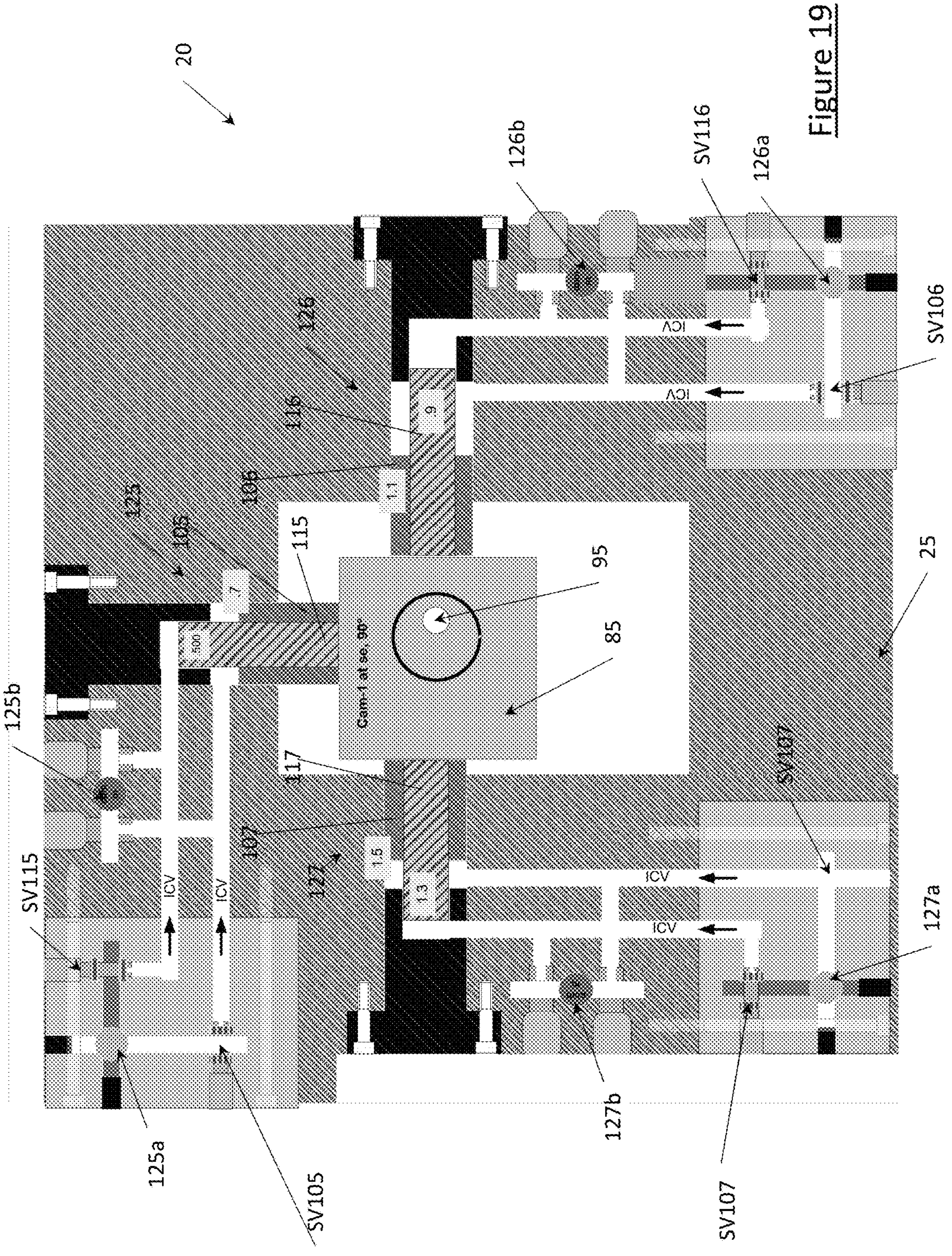
FIG. 19 is a further embodiment of the hydraulic device of FIG. 18.

Referring to FIG. 19, shown is an alternative embodiment of the hydraulic device 20 of FIGS. 16, 17 having different sized piston pairs 105, 115, 106, 116, 107, 117 in the housing 24, such that the common actuator 85 (on shaft 95) is coupled for actuation with all of the piston pairs 105,115, 106, 116, 107, 117. Shown is an end cross sectional view of the hydraulic device 20, such that each piston pair 105, 115, 106, 116, 107, 117 shown represents a set 125, 126, 127 of piston pairs 105, 115, 106, 116, 107, 117 of the hydraulic device of FIG. 19. For example, the hydraulic device 20 can be configured as a 9 piston pair device, such that there are three piston pairs 105, 115 in line (e.g. adjacent) with one another as a first piston set 125 (e.g. each piston set has multiple piston pairs), there are three piston pairs 106, 116 in line with one another as a second piston set 126, and there are three piston pairs 107, 117 in line with one another as a third piston set 127. In view of this, there is a common inlet gallery 125*a* feeding all piston pairs 105, 115 of the first piston set 125 and a common outlet gallery 125*b* being fed by all piston pairs 105, 115 of the first piston set 125. Similarly, there is a common inlet gallery 126*a* feeding all piston pairs 106, 116 of the second piston set 126 and a common outlet gallery 126*b* being fed by all piston pairs 106, 116 of the second piston set 126. Similarly, there is a common inlet gallery 127*a* feeding all piston pairs 107, 117 of the third piston set 127 and a common outlet gallery 127*b* being fed by all piston pairs 107, 117 of the third piston set 127. Further, each of the pistons 105, 115, 106, 116, 107, 117 have isolated bores by way of check valves ICV with respect to the inlet and outlet galleries 125*a*, 125*b*, 126*a*, 126*b*, 127*a*, 127*b* as shown.

In terms of controlling entrance of hydraulic fluid into the bores of the piston sets 125, 126, 127, there are provided corresponding respective control valves SV105, SV115, SV106, SV116, SV107, SV 117. For example, control valve SV105 controls (e.g. either allows or restricts/blocks) the flow of fluid from inlet gallery 125*a* to all of the pistons 105 (e.g. the three pistons 105 in the first piston set 125) at the same time. For example, control valve SV115 controls (e.g. either allows or restricts/blocks) the flow of fluid from inlet gallery 125*a* to all of the pistons 115 (e.g. the three pistons 115 in the first piston set 125) at the same time. This control setup can be replicated for the other piston sets 126, 127. Further, it is shown that the outlet of each piston is directed to the corresponding outlet gallery, for example all three pistons 105 outflow into the outlet gallery 125*b*, as do all three pistons 115 (of the first piston set 125) also outflow into the outlet gallery 125*b*. It is recognized that as discussed previously, if a control valve blocks the flow of fluid for a set of pistons, then all those blocked pistons ultimately decouple from the actuator 85. For example, if control valve SV105 is closed, then all three pistons 105 of the first piston set 125 will be starved of hydraulic fluid from the inlet gallery 125*a* and thus decouple from the actuator 85, while the three pistons 115 of the first piston set 125 remain coupled and thus contributing to the outlet flow (e.g. via outlet gallery 125*b*) of the hydraulic device 20. It is only if the control valve SV115 is closed, will the three pistons 115 become starved and thus decouple from the actuator 85. It is recognized that the other pistons 106, 116, 107, 117 would behave in the same manner (e.g. decoupled or not) depending upon the open/close state(s) of the respective control valves SV106, 116, 107,117.

In view of the above, FIG. 19 represents multiple (e.g. trio) sets 125, 126, 127 of respective piston pairs 105, 115, 106, 116, 107, 117, thus providing in effect an 18 piston hydraulic device 20 (e.g. there are three pistons 105, three pistons 115, three pistons 106, etc.). Further, as discussed, it is recognized that all similar pistons (e.g. all three pistons 105, all three pistons 115, etc.) can be decoupled at the same time via a shared control valve. In this manner, applicant has experienced advantageously that we can unload all similar pistons of a set 125, 126, 127 at same time to reduce flow of the hydraulic device 20, which helps provide a "multi-stage" variable displacement hydraulic device 20. For example, all pistons 105 can be decoupled while all other pistons 115, 106, 116, 107, 117 remain coupled and in operation (e.g. a first stage flow reduction). Then all pistons 106 can be decoupled while all other pistons 115, 116, 107, 117 remain coupled and in operation (e.g. a second stage flow reduction). Then all pistons 107 can be decoupled while all other pistons 115, 116, 117 remain coupled and in operation (e.g. a third stage flow reduction). It is recognized that any order of closing the control valves SV105, 115, 106, 116,107, 117 can be performed as desired, In order to achieve the multi-stage flow reduction, for example with all control valves SV105, 115,106, 116, 107,117 open, first SV105 can be closed, then SV116, then SV107, then SV117, etc.

In view of the above, the hydraulic device 20 can be a multi cylinder (e.g. 9) pump 20, 3 piston pairs on each side, e.g. side/set 125, side/set 126, and side/set 127. Each cylinder bore hosts a multi-piston arrangement (e.g. a pair of pistons—inner-outer). In other words; a pump 20 with 9 sets of cylinders and each cylinder hosts a duo-set, that makes it for an 18 piston pump 20, by example. As shown by example, on each respective set 125,126, 127 of the pump 20, all the respective inner pistons 115, 116, 117 will have isolated bores by way of check valves CV1 (in-out) but will share the respective common outlet gallery 125*b*, 126*b*, 127*b* and the respective common inlet gallery 125*a*, 126*a*, 127*b*. This is repeated for each set of outer pistons 105, 106, 107 set up the same way. This configuration would provide for the pump 20 to advantageously have three individual outlet ports 125*b*, 126*b*, 127*b*. Further, each of the inlet galleries 125*a*, 126*a*, 127*a* can then be controlled by flow-control-valve(s)/solenoid(s) while the outlet galleries 125*b*, 126*b*, 127*b* do not preferably use any control valves. In summary, this configuration allows for any selected group (by way of the operated control valves(s)) of multiple (e.g. 3) pistons in any piston set 125, 126, 127 to be decoupled at the same time by any means to provide a reduction in flow output of the pump 20.

It is recognized that in the embodiment represented by FIG. 19, each piston 105, 115, 106, 116,107,117 can be of the same or different diameters. FIGS. 16, 17 show by example each of the diameters of the pistons 105,115, 106, 116, 107,117 measured in centimeters (e.g. 1.3 cm for the pistons 117, etc.).

Figure 20:
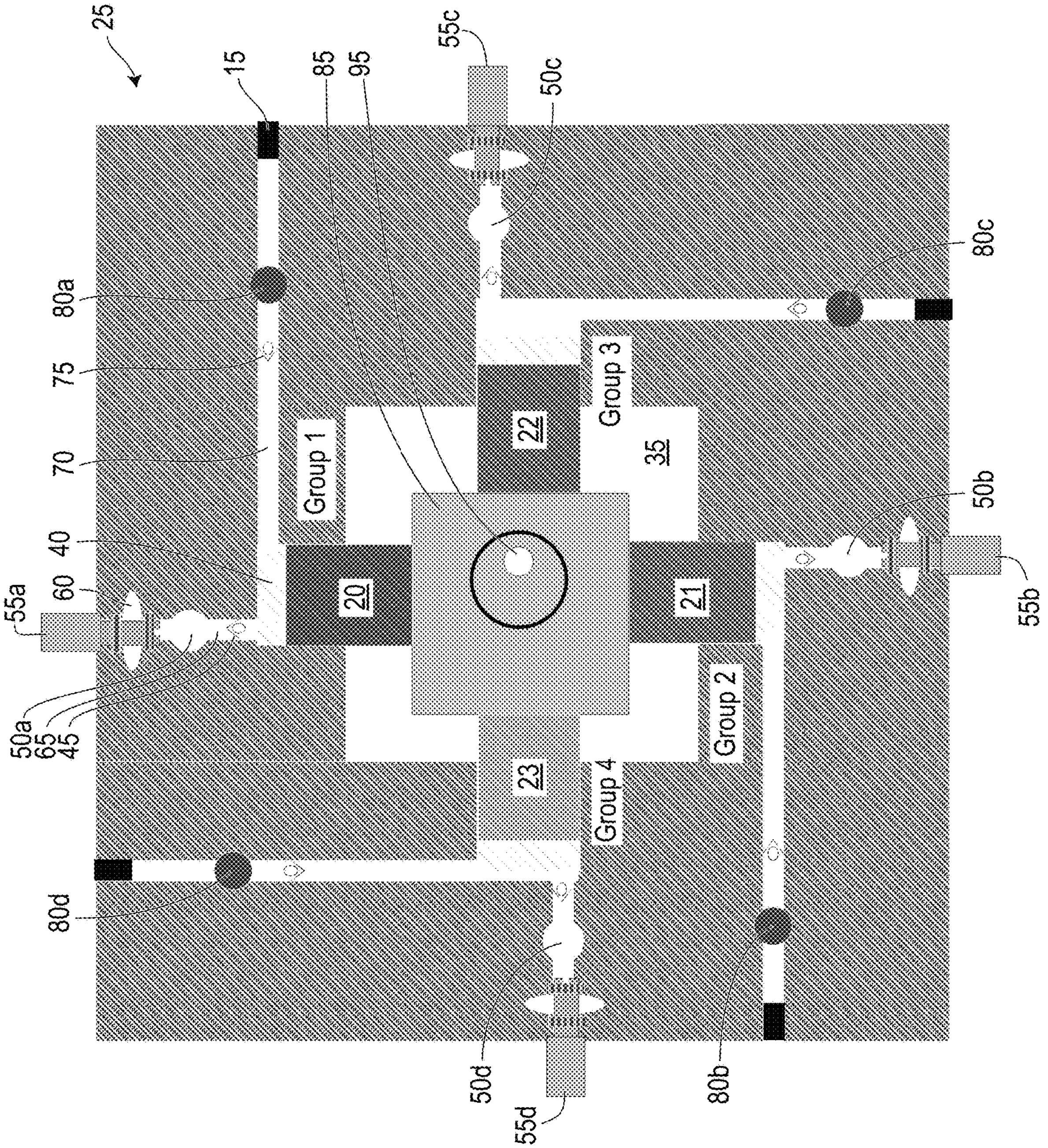
FIG. 20 is a further embodiment of the hydraulic device of FIG. 19.

Referring to FIG. 20, shown is a further embodiment of the hydraulic device 20 of FIG. 19, such that each piston set, labelled as group 1, group 2, group 3, group 4, only has a single piston 105, 106, 107, 108, i.e. there are no nested piston pairs (e.g. 105, 115), rather just single pistons. Similar to the embodiment of the hydraulic device 20 of FIG. 19, each piston group 1, 2, 3, 4 has multiple pistons in line (e.g. adjacent) with one another (see FIGS. 21A,B). For example, the hydraulic device 10 of FIGS. 20, 21A,B has four piston sets 1, 2, 3, 4, where each set has 5 pistons, for a total of 20 pistons. Further, shown are plugs 15 for drill holes, main pistons 20,21,22,23 of each group 1,2,3,4, the actuator 85 and main shaft 95 with oil pan/case 35. Shown for each of the piston groups 1,2,3,4 are piston bores 40, inlet check valves 45, respective inlet common gallery 50*a,b,c,d*, respective flow control valves 55*a,b,c,d*, inlet ports 60, pistons inlet ports 65, pistons outlet ports 70, outlet check valves 75 and respective outlet common gallery 80*a,b,c,d.*

Figure 21A:
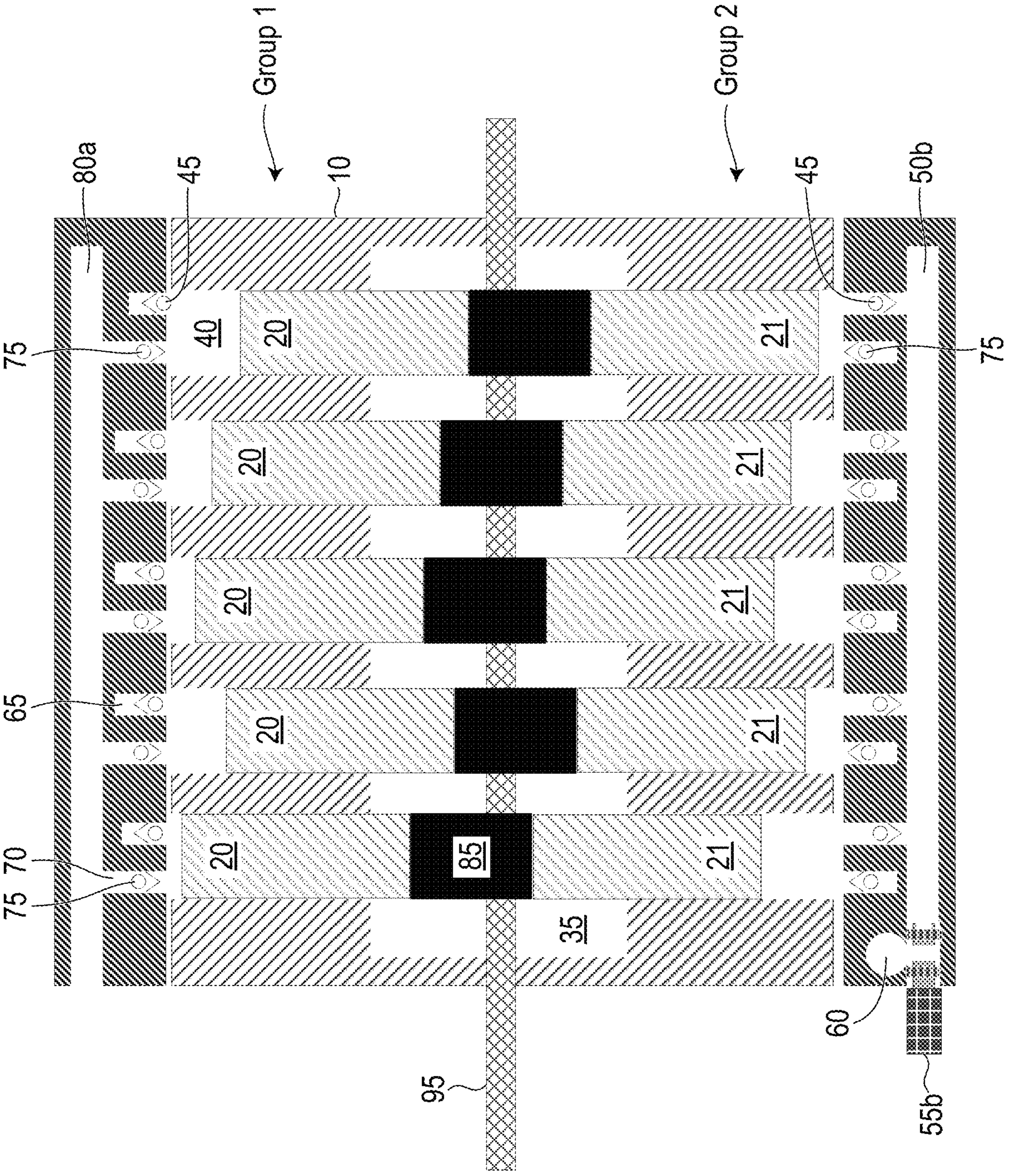
FIGS. 21A,B show the device of FIG. 20 in various operational states.
Figure 21B:
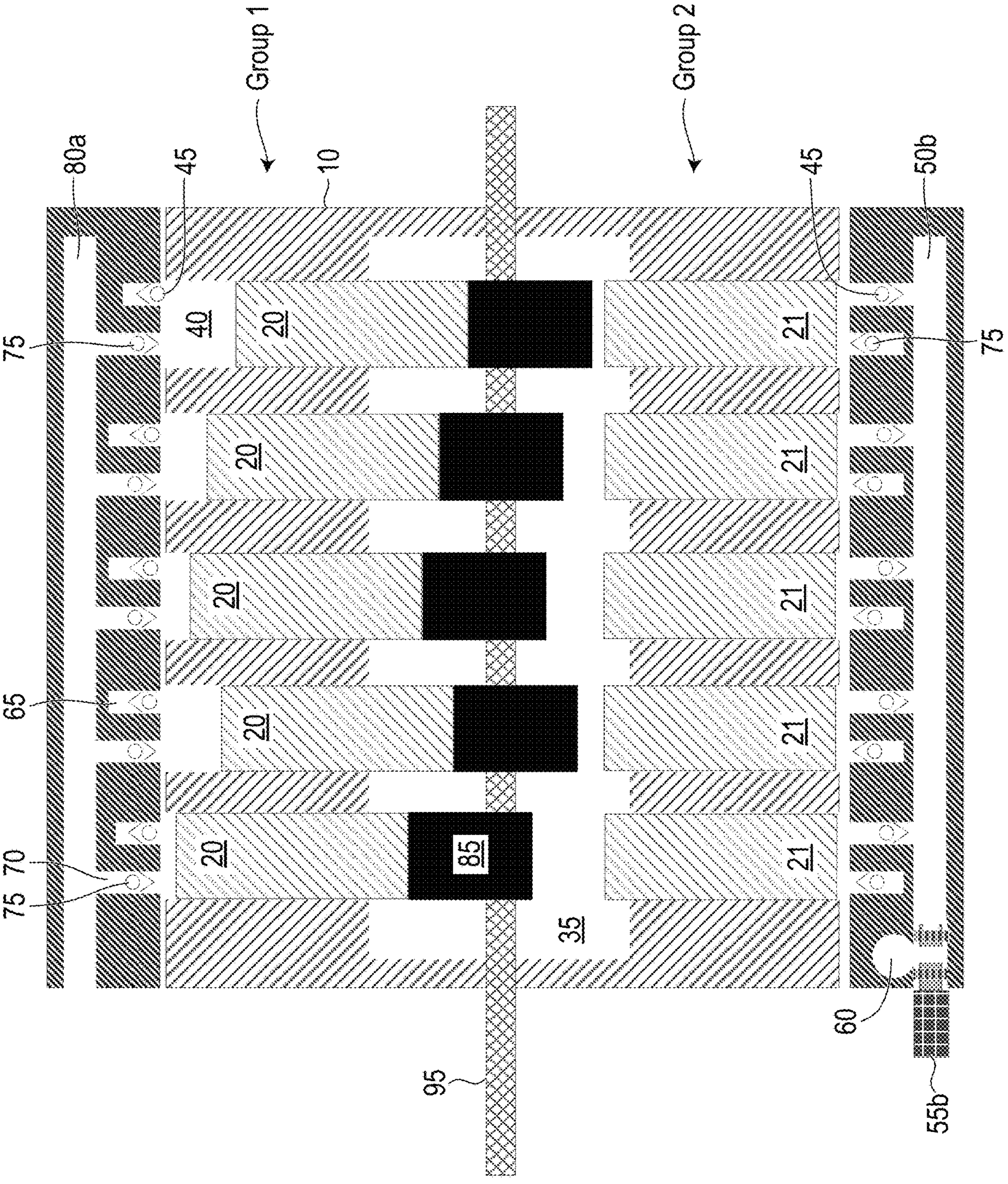

Referring to FIG. 21A, shown are groups 1,2, such that group 1 is in both intake mode (pistons travelling TDC to BDC) and exhaust mode (pistons travelling BDC to TDC) during each shaft 95 rotation and group 2 similarly, such that all control valves 55*a,b* are open and thus proving for the pistons 20,21 to remain coupled with the actuator 85. Referring to FIG. 21B, shown are groups 1,2, such that group 2 is in decouple mode (pistons remaining at TDC) and group 2 is in intake/exhaust modes, such that the control valve 55*b* is closed and thus starving the inlet of the pistons 21 while control valve 55*a* is open and thus proving for the pistons 20 to remain coupled with the actuator 85.

Referring again to FIG. 20, there is a common inlet gallery 50*a* feeding the pistons 20 of the first piston group 1 and a common outlet gallery 80*a* being fed by all pistons 20 of the first piston group 1. Similarly, there is a common inlet gallery 50*b* feeding all pistons 21 of the second piston group 2 and a common outlet gallery 80*b* being fed by all pistons 21. Similarly, there is a common inlet gallery 50*c* feeding all pistons 22 of the third piston group 3 and a common outlet gallery 80*c* being fed by all pistons 22. Similarly, there is a common inlet gallery 50*d* feeding all pistons 23 of the fourth piston group 4 and a common outlet gallery 80*d* being fed by all pistons 23. Further, each of the pistons 20,21,22,23 have isolated bores by way of check valves 45,75 with respect to the inlet and outlet galleries as shown.

In terms of controlling entrance of hydraulic fluid into the bores of the piston groups 1,2,3,4, there are provided corresponding respective control valves 55*a,b,c,d*. For example, control valve 55*a* controls (e.g. either allows or restricts/blocks) the flow of fluid from inlet gallery 50*a* to all of the pistons 20 (e.g. the 5 pistons 21 in the first piston group 1) at the same time. For example, control valve 55*b* controls (e.g. either allows or restricts/blocks) the flow of fluid from inlet gallery 50*b* to all of the pistons 22 (e.g. the 5 pistons 22 in the second piston group 2) at the same time. This control setup can be replicated for the other piston groups 3,4. Further, it is shown that the outlet of each piston is directed to the corresponding outlet gallery, for example all 5 pistons 20 outflow into the outlet gallery 80*a*. It is recognized that as discussed previously, if a control valve blocks the flow of fluid for a group of pistons, then all those blocked/starved pistons ultimately decouple from the actuator 85. For example, if control valve 50*a* is closed, then all 5 pistons 20 of the first piston group 1 will be starved of hydraulic fluid from the inlet gallery 50*a* and thus decouple from the actuator 85, while the remaining 15 pistons 21,22,23 of the groups 2,3,4 remain coupled and thus contributing to the outlet flow (e.g. via outlet galleries 80*b,c,d*) of the hydraulic device 10. It is recognized that the other pistons 21,22,23 would behave in the same manner (e.g. decoupled or not) depending upon the open/close state(s) of the respective control valves 55*b,c,d*.

In view of the above, FIG. 20 represents multiple (e.g. quintuple) groups 1,2,3,4 of respective pistons 20,21,22,23, thus providing in effect a 20 piston hydraulic device 10 (e.g. there are 5 pistons 20, 5 pistons 21, 5 pistons 22, etc.). Further, as discussed, it is recognized that all similar pistons (e.g. all 5 pistons 20, all 5 pistons 21, etc.) can be decoupled at the same time via a respective shared control valve. In this manner, applicant has experienced advantageously that we can unload all similar pistons of a group 1,2,3,4 at same time to reduce flow of the hydraulic device 10, which helps provide a "multi-stage" variable displacement hydraulic device 10. For example, all pistons 20 can be decoupled while all other pistons 21,22,23 remain coupled and in operation (e.g. a first stage flow reduction). Then all pistons 21 can be decoupled while all other pistons 22,23 remain coupled and in operation (e.g. a second stage flow reduction). Then all pistons 22 can be decoupled while all other pistons 23 remain coupled and in operation (e.g. a third stage flow reduction). It is recognized that any order of closing the control valves 55*a,b,c,d* can be performed as desired, in order to achieve the multistage flow reduction, for example with all control valves 55*a,b,c,d* open, first valve 55*a* can be closed, then valve 55*b*, then valve 55*c*, then valve 55*d*, etc.

In view of the above, the hydraulic device 10 can be a multi cylinder (e.g. 20) pump 10, 4 pistons on each side, e.g. side/group 1, side/group 2, and side/groups 3,4. Each cylinder bore hosts a single piston arrangement. As shown by example, on each respective group 1,2,3,4 of the pump 10, all the respective pistons 20,21,22,23 will have isolated bores by way of check valves 45,75 (in-out) but will share the respective common outlet gallery 80*a,b,c,d* and the respective common inlet gallery 50*a,b,c,d*. This configuration would provide for the pump 10 to advantageously have 4 individual outlet ports 80*a,b,c,d*. Further, each of the inlet galleries 50*a,b,c,d* can then be controlled by flow-control-valve(s)/solenoid(s) while the outlet galleries 809*a,b,c,d* do not preferably use any control valves. In summary, this configuration allows for any selected group (by way of the operated control valves(s)) of multiple (e.g. 5) pistons in any piston group 1,2,3,4 to be decoupled at the same time by any means to provide a reduction in flow output of the pump 10.

Figure 22:
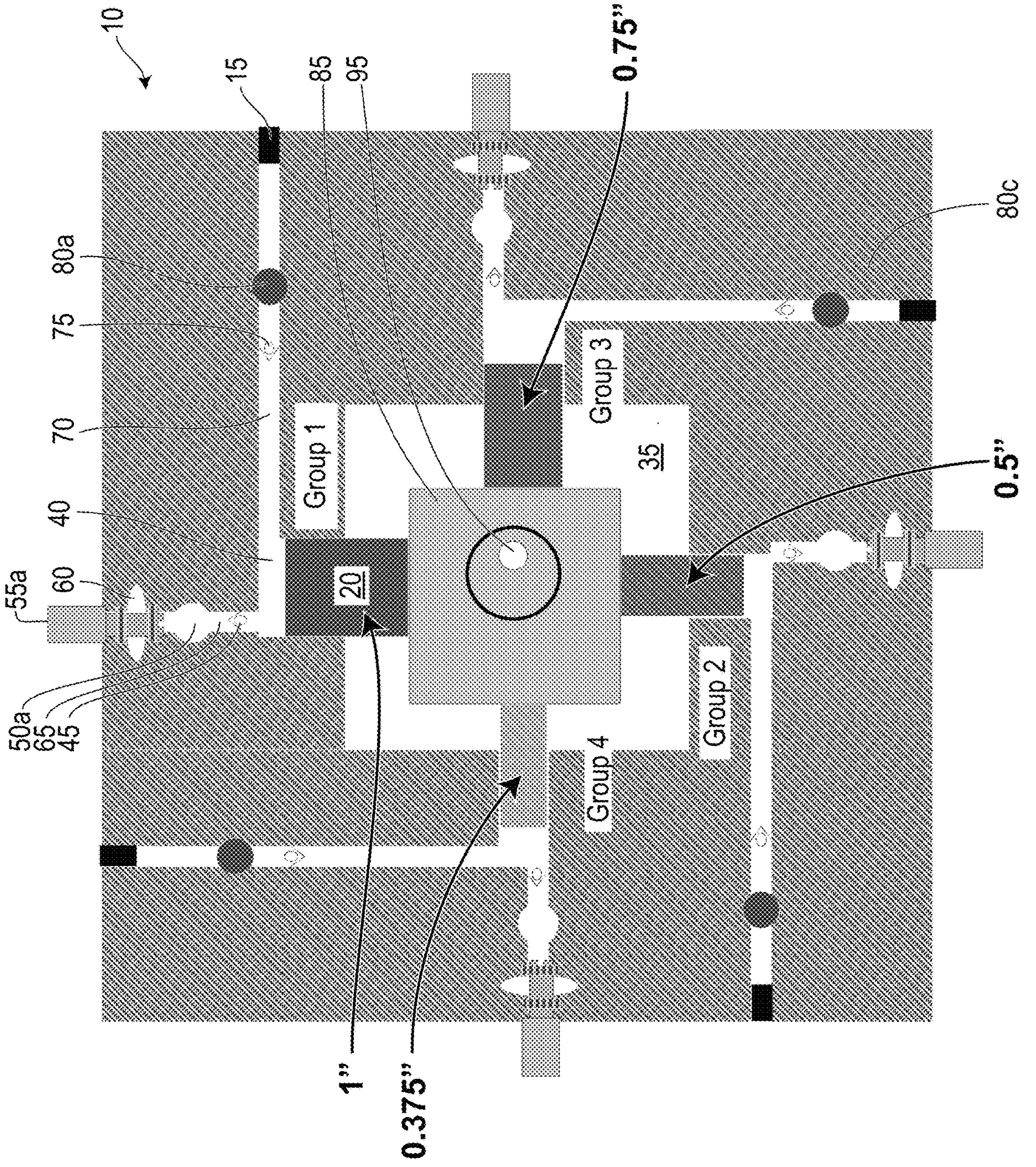
FIG. 22 is a further embodiment of the hydraulic device of FIG. 20.

It is recognized that in the embodiment represented by FIG. 20, each piston 20,21,22,23 can be of the same or different diameters. FIG. 20 shows by example each of the diameters of the pistons 20,21,22,23 as the same. FIG. 22 shows by example each of the diameters of the respective pistons (e.g. four sets of four pistons) of the piston groups 1,2,3,4 as different. For example, each of the pistons 20 of piston group 1 would be of a 1 inch diameter, etc.

Figure 23:
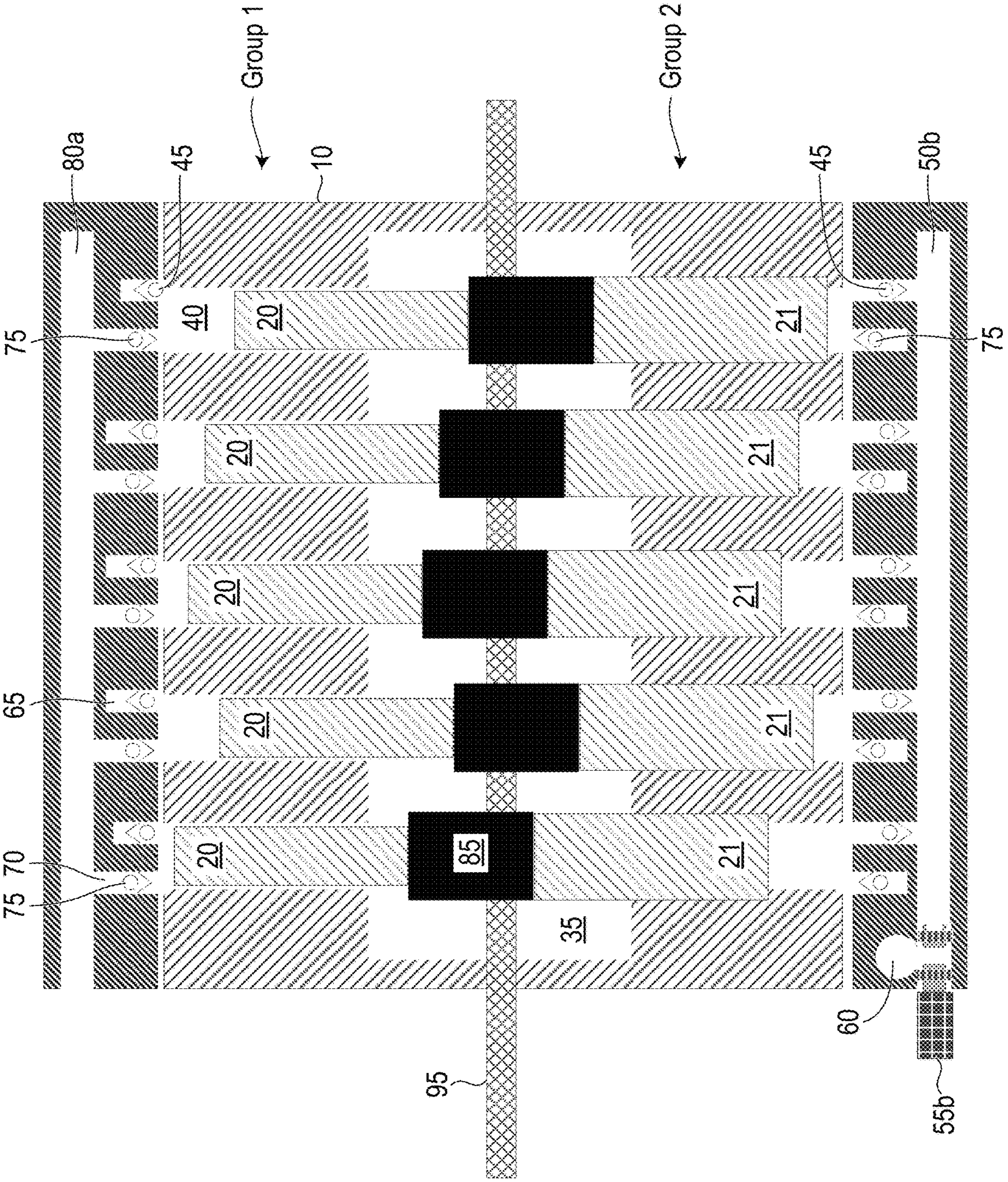
FIG. 23 shows the device of FIG. 22 in an operational state.

Referring to FIG. 23, shown are groups 1,2 of the hydraulic device 10 of FIG. 22, such that group 1 is in intake/exhaust modes and group 2 is in intake/exhaust modes, such that all control valves 55*a,b* are open and thus proving for the pistons 20,21 to remain coupled with the actuator 85.

Figure 24B:
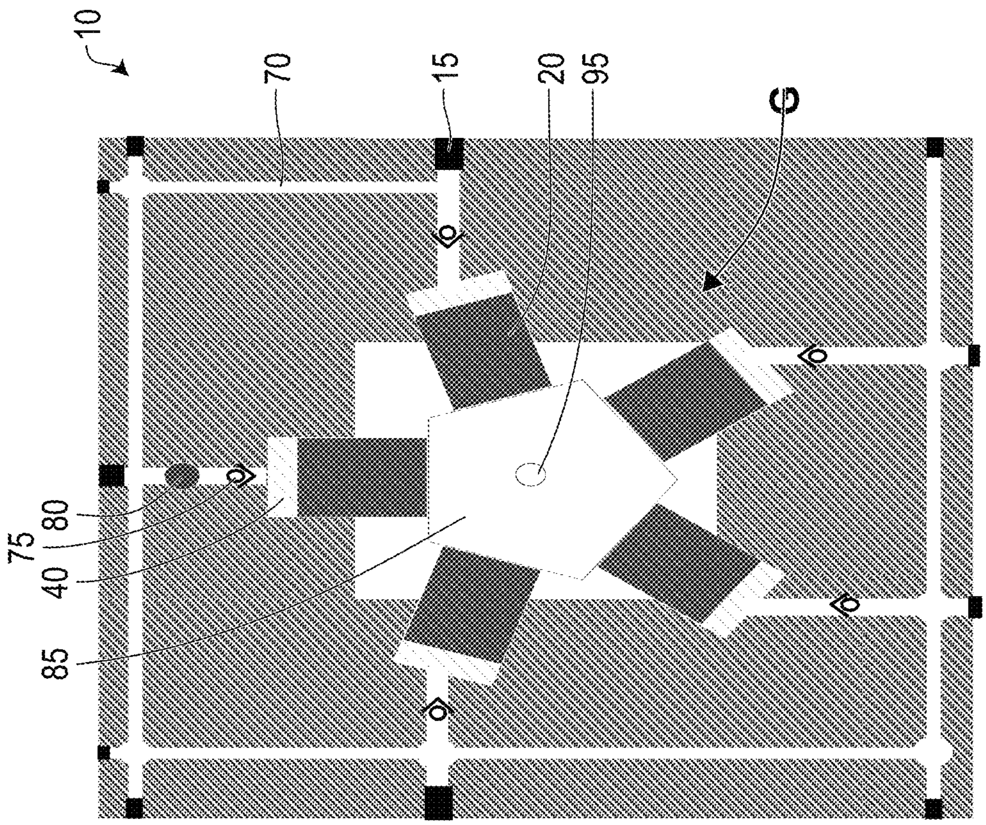
FIGS. 24A,B show a further embodiment of the hydraulic device of FIG. 20.
Figure 24A:
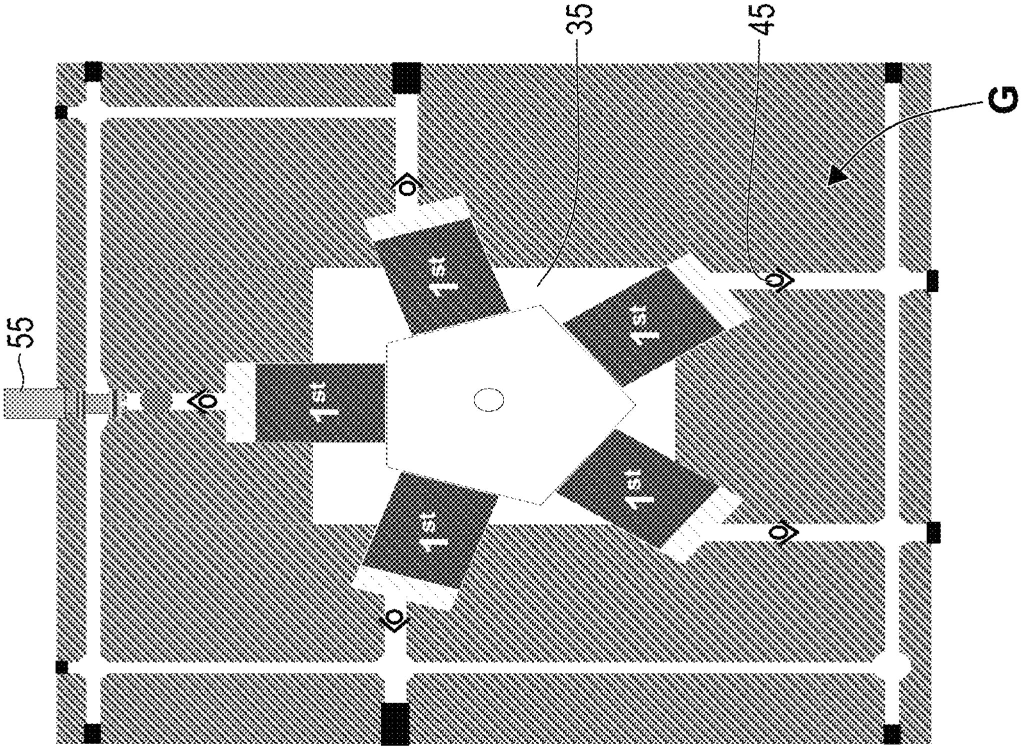

FIGS. 24A,B show a further embodiment of the hydraulic device 10 in an intake mode and an exhaust mode, for example showing a five piston 20 arrangement for each group G, particularly in view of the inlet check valves in FIG. 24*a* and outlet check valves in FIG. 24*b* as they are configured in back to back positioning.

I claim:

1. A variable displacement hydraulic device comprising:

a housing having an inlet for receiving hydraulic fluid and an outlet for outputting the hydraulic fluid, the housing having a reciprocation axis;

a first cylinder positioned in the housing along the reciprocation axis, the first cylinder having a first input for receiving the hydraulic fluid on a first intake stroke and a first output for ejecting the hydraulic fluid on a first exhaust stroke;

a first piston positioned for a first reciprocal motion within the first cylinder, the first piston having a first main end exposed to the hydraulic fluid and a second main end coupled to an actuator, the actuator for driving the second main end when coupled to the actuator for causing the first reciprocal motion to induce a first portion of said outputting of the hydraulic fluid;

a second cylinder positioned in the first piston along the reciprocation axis, the second cylinder having a second input for receiving the hydraulic fluid on a second intake stroke and a second output for ejecting the hydraulic fluid on a second exhaust stroke;

a second piston positioned for a second reciprocal motion within the second cylinder, the second piston having a first secondary end exposed to the hydraulic fluid and a second secondary end coupled to the actuator, the actuator for driving the second secondary end when coupled to the actuator for causing the second reciprocal motion to induce a second portion of said outputting of the hydraulic fluid; and a locking mechanism for inhibiting the first reciprocal motion of the first piston;

wherein when engaged the locking mechanism inhibits the first portion of said outputting of the hydraulic fluid by decoupling the first piston from the actuator while continued operation of the actuator provides the second portion of said outputting of the hydraulic fluid by the second piston.

2. The hydraulic device of claim 1, wherein the second piston is concentrically positioned within the first piston on the reciprocation axis.

3. The hydraulic device of claim 1, wherein the first output and the second output are fluidly coupled at the outlet.

4. The hydraulic device of claim 1, wherein the first input and the second input are fluidly coupled at the inlet.

5. The hydraulic device of claim 1, wherein the actuator includes an eccentric cam driven off a shaft, the eccentric cam having a cam surface for contacting the second main end and the second secondary end during the first reciprocal motion and the second reciprocal motion.

6. The hydraulic device of claim 5, wherein the cam surface decouples from the second main end while retaining contact with the second secondary end when the locking mechanism is engaged with the first piston.

7. The hydraulic device of claim 1, wherein the actuator includes an eccentric cam driven off a shaft, the eccentric cam having a first cam surface for contacting the second main end and a second cam surface for contacting the second secondary end during the first reciprocal motion and the second reciprocal motion, such that the first cam surface is offset from the second cam surface.

8. The hydraulic device of claim 7, wherein the first cam surface decouples from the second main end while the second cam surface retains contact with the second secondary end when the locking mechanism is engaged with the first piston.

9. The hydraulic device of claim 1, wherein the locking mechanism is a hydraulic locking mechanism, such that the hydraulic locking mechanism inhibits at least one of: the first input from receiving the hydraulic fluid on the first intake stroke; and the first output from ejecting the hydraulic fluid on the first exhaust stroke.

10. The hydraulic device of claim 1, wherein the hydraulic locking mechanism includes at least one of: a first valve positioned on the first input for inhibiting receipt of the hydraulic fluid on the first intake stroke; a second valve positioned on the first output for inhibiting ejection of the hydraulic fluid on the first exhaust stroke.

11. The hydraulic device of claim 1, wherein the locking mechanism is a mechanical locking mechanism, such that the mechanical locking mechanism inhibits the first reciprocal motion.

12. The hydraulic device of claim 11, wherein the mechanical locking mechanism includes a mechanical element positioned adjacent to a sidewall of the first piston, such that contact of the mechanical element with the sidewall is used to inhibit the first reciprocal motion.

13. The hydraulic device of claim 1, wherein the locking mechanism is a magnetic locking mechanism, such that the magnetic locking mechanism inhibits the first reciprocal motion.

14. The hydraulic device of claim 13, wherein the magnetic locking mechanism includes a solenoid element positioned adjacent to a sidewall of the first piston, such that operation of the solenoid element is used to inhibit the first reciprocal motion.

15. The hydraulic device of claim 1, wherein the first main end and the second main end are offset from one another when the first main end is at a first Top Dead Center of the first reciprocal motion and the first secondary end is at a second Top Dead Center of the second reciprocal motion.

16. The hydraulic device of claim 1, wherein the first main end and the second main end are offset from one another by 180 degrees.

17. The hydraulic device of claim 1, wherein the first output is fluidly coupled to the outlet and the second output is fluidly coupled to a second outlet of the housing, such that the first portion is ejected from the outlet and the second portion is ejected separately from the second outlet, the first output fluidly coupled to the outlet and the second output fluidly coupled to the second outlet.

18. The hydraulic device of claim 1 further comprising a first check valve positioned in the first input, a second check valve positioned in the first output, a third check valve positioned in the second input and a fourth check valve positioned in the second output.

19. The hydraulic device of claim 1 further comprising a second locking mechanism for inhibiting the second reciprocal motion of the second piston.

20. The hydraulic device of claim 1, wherein reengagement of the first piston with the actuator occurs when the actuator is travelling towards TDC and the first piston is travelling towards BDC after the locking mechanism is disengaged.

21. The hydraulic device of claim 19, wherein reengagement of the second piston with the actuator occurs when the actuator is travelling towards TDC and the second piston is travelling towards BDC after the second locking mechanism is disengaged.

22. The hydraulic device of claim 1, wherein the hydraulic device is a pump.

23. The hydraulic device of claim 1, wherein the hydraulic device is a motor.

24. The hydraulic device of claim 1, wherein rotation of a driveshaft coupled to the actuator is in a clockwise direction or a counter clockwise direction.

25. The hydraulic device of claim 1, wherein first reciprocal motion of the first piston is controlled by the locking mechanism as a first locking mechanism and the second reciprocal motion of the second piston is controlled by a second locking mechanism.

26. The hydraulic device of claim 1, wherein the first piston and the second piston are a first piston pair of the housing and a third piston and a fourth piston are a second piston pair of the housing, such that the fourth piston is positioned in the third piston.

27. The hydraulic device of claim 26, wherein first reciprocal motion of the first piston is controlled by the locking mechanism as a first locking mechanism, the second reciprocal motion of the second piston is controlled by a second locking mechanism, a third reciprocal motion of the third piston is controlled by a third locking mechanism, and a fourth reciprocal motion of the fourth piston is controlled by a fourth locking mechanism.

28. The hydraulic device of claim 26, wherein first reciprocal motion of the first piston is controlled by the locking mechanism as a first locking mechanism, the second reciprocal motion of the second piston is controlled by a second locking mechanism, a third reciprocal motion of the third piston is controlled by the first locking mechanism, and a fourth reciprocal motion of the fourth piston is controlled by the second locking mechanism.

29. A variable displacement hydraulic device comprising:

a housing having an inlet for receiving hydraulic fluid and an outlet for outputting the hydraulic fluid, the housing having a reciprocation axis;

a first cylinder positioned in the housing along the reciprocation axis, the first cylinder having a first input for receiving the hydraulic fluid on a first intake stroke and a first output for ejecting the hydraulic fluid on a first exhaust stroke;

a first piston positioned for a first reciprocal motion within the first cylinder, the first piston having a first main end exposed to the hydraulic fluid and a second main end coupled to an actuator, the actuator for driving the second main end when coupled to the actuator for causing the first reciprocal motion to induce a first portion of said outputting of the hydraulic fluid;

a second cylinder positioned in the first piston along the reciprocation axis, the second cylinder having a second input for receiving the hydraulic fluid on a second intake stroke and a second output for ejecting the hydraulic fluid on a second exhaust stroke;

a second piston positioned for a second reciprocal motion within the second cylinder, the second piston having a first secondary end exposed to the hydraulic fluid and a second secondary end coupled to the actuator, the actuator for driving the second secondary end when coupled to the actuator for causing the second reciprocal motion to induce a second portion of said outputting of the hydraulic fluid; and a locking mechanism for inhibiting the second reciprocal motion of the second piston;

wherein when engaged the locking mechanism inhibits the second portion of said outputting of the hydraulic fluid by decoupling the second piston from the actuator while continued operation of the actuator provides the first portion of said outputting of the hydraulic fluid by the first piston.

* * * * *